(12) United States Patent
Taniguchi et al.

(10) Patent No.: US 6,702,469 B1
(45) Date of Patent: Mar. 9, 2004

(54) RESIN MOLDED ARTICLE

(75) Inventors: Hisashi Taniguchi, Yamato (JP);
Masakatsu Iwata, Kawasaki (JP);
Masanori Kaneko, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 123 days.

(21) Appl. No.: 09/597,144

(22) Filed: Jun. 20, 2000

(30) Foreign Application Priority Data

Jun. 21, 1999 (JP) .......................................... 11-173727

(51) Int. Cl.⁷ .............................................. B29C 45/16
(52) U.S. Cl. ..................... 384/418; 384/276; 264/242; 425/130; 492/16
(58) Field of Search ................... 264/242, 267; 425/127, 129.1, 130; 29/894, 898; 384/58, 276, 418; 492/16; 198/780; 193/35 F, 37

(56) References Cited

U.S. PATENT DOCUMENTS

| | | | | | |
|---|---|---|---|---|---|
| 3,591,669 | A | * | 7/1971 | Memory | 264/242 |
| 3,785,217 | A | * | 1/1974 | Peura | 264/242 |
| 4,567,633 | A | * | 2/1986 | Corkery | 264/267 |
| 4,886,377 | A | * | 12/1989 | Adachi et al. | 29/898.064 |

FOREIGN PATENT DOCUMENTS

JP          06-93306      * 4/1994

* cited by examiner

Primary Examiner—William C Joyce
(74) Attorney, Agent, or Firm—Fitzpatrick, Cella, Harper & Scinto

(57) ABSTRACT

The present invention relates to an resin molded article, which is molded, using at least a first resin material and a second resin material having substantially no compatibility with one another, by an insert molding or a two-color molding to be in a state where a first member and a second member are incorporated. A clearance is produced between the first member and the second member.

1 Claim, 31 Drawing Sheets

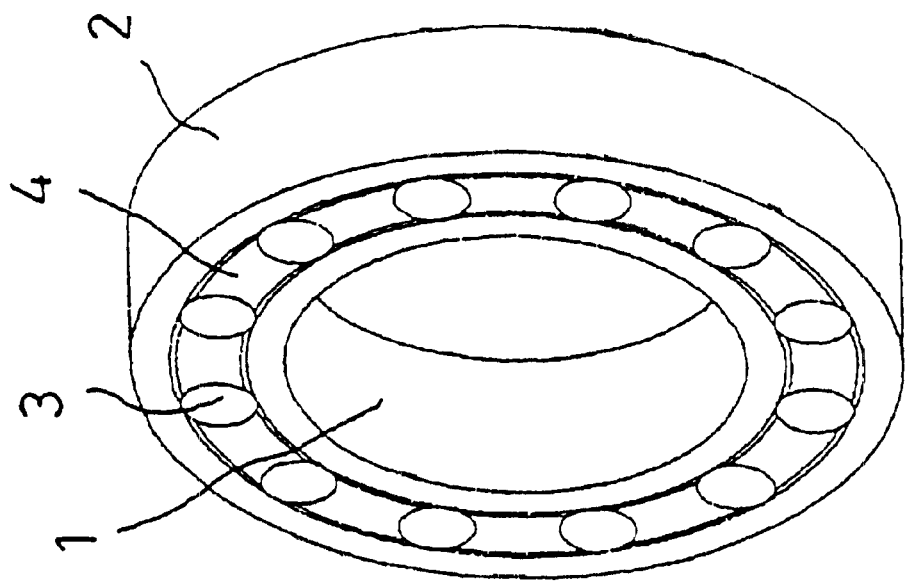
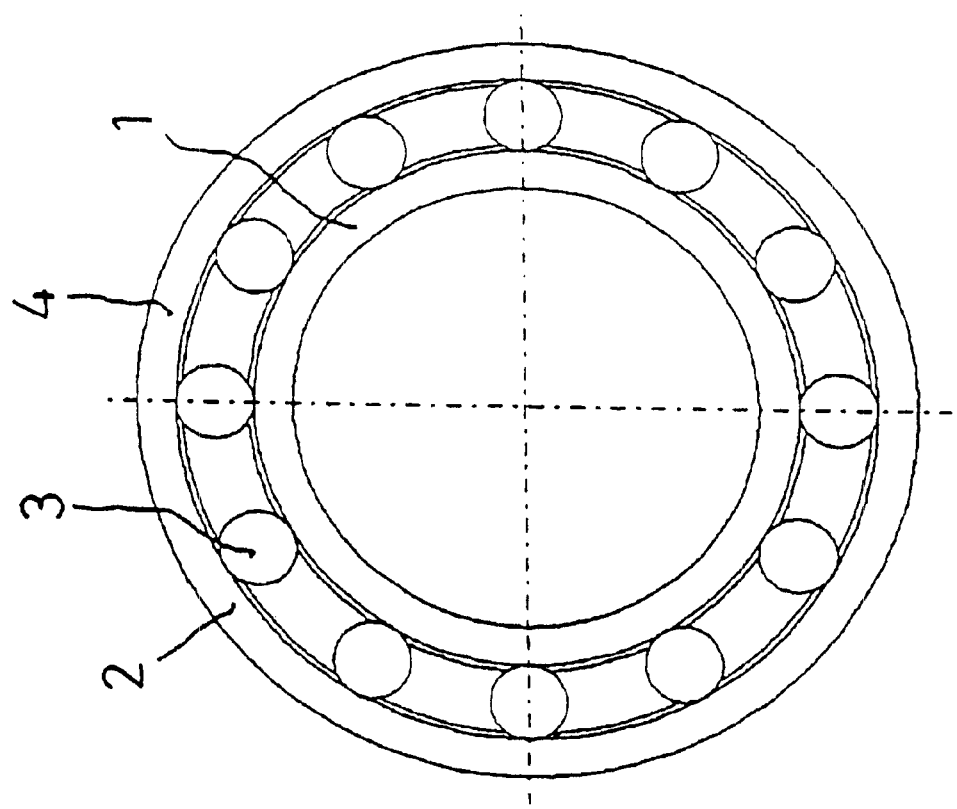

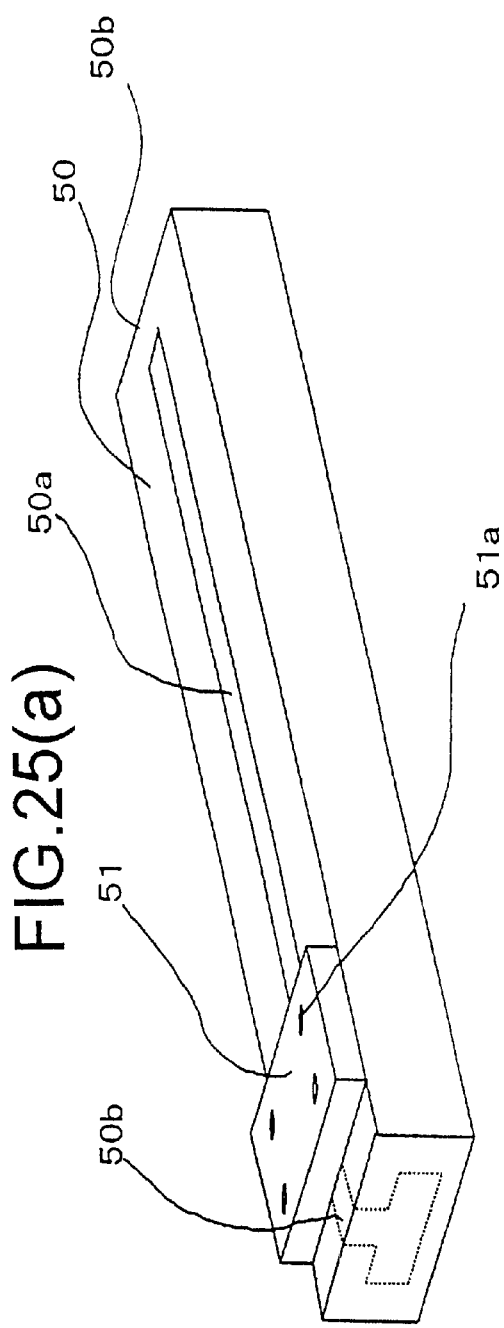
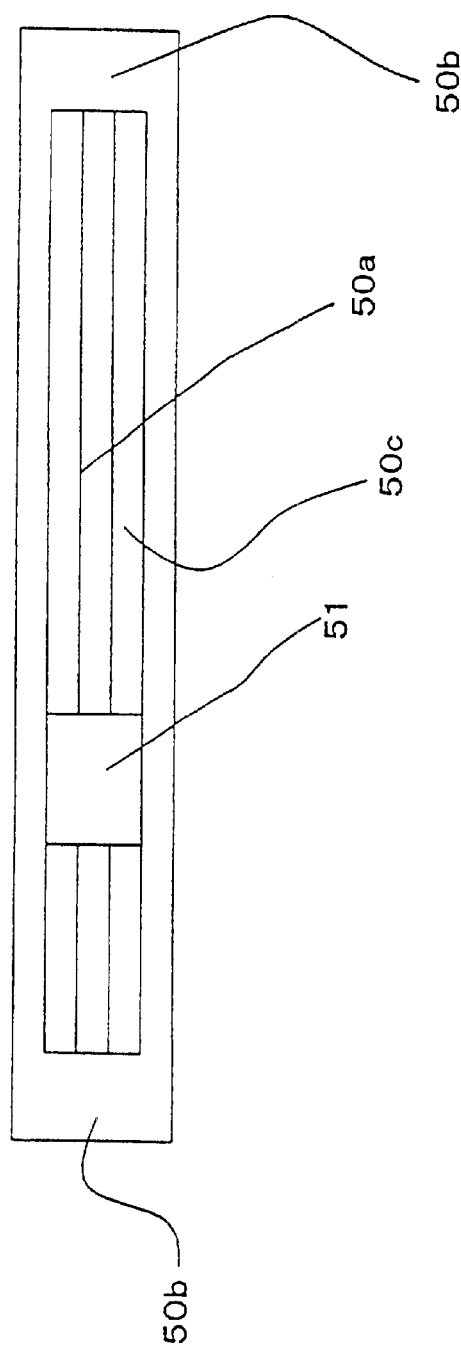
FIG.25(a)
FIG.25(b)

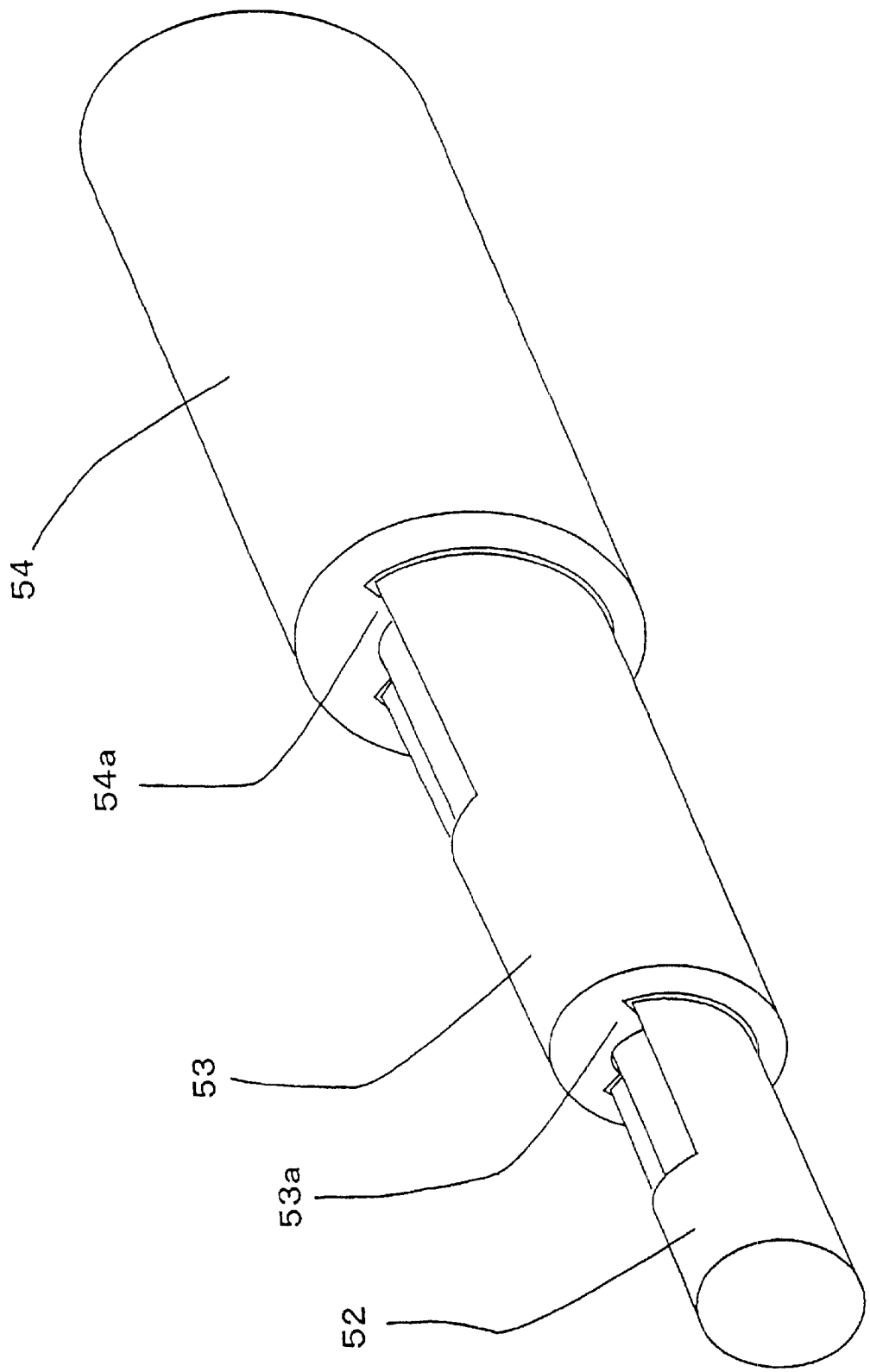

RESIN MOLDED ARTICLE

BACKGROUND OF THE INVENTION

1. Field of the Invention

The present invention relates to a resin molded article consisting of a plurality of members incorporated therein, more preferably, to a resin molded article eliminating the necessity of assembling steps and making it possible to easily obtain an appropriate clearance between the members.

2. Description of Prior Art

Equipment such as copying machines, printers, scanners or the like is structured by assembling many parts such as roller members for conveying sheets, gear members for transmitting driving force to the roller members, bearing members, and the like, and the parts to be used for the equipment are often constituted of resins.

In order to manufacture such a resin molded part, it is generally assumed that each of parts is first molded by injection molding or the like, and then two or more of the parts are assembled to constitute a unit. In the case of a gear unit, for example, a gear member and a bearing member are separately molded to be assembled together, and further a slip stopper is attached thereto for preventing those parts from slipping. In the case of a bearing unit, an outer ring, an inner ring, roller members to be arranged between the both rings, or the like are first molded, and then those are assembled to constitute a unit.

Such a conventional manner, however, requires a step of manufacturing independently a plurality of parts and then engagingly assembling those parts, which has become a factor in increasing costs.

In addition, when a plurality of parts were assembled, especially in the case of rotary members such as rollers, gears or the like, a clearance between the members was required to be controlled with accuracy, but measurement errors easily occured at the time of manufacturing independently a plurality of the parts. Therefore, maintaining control with accuracy was not easy.

SUMMARY OF THE INVENTION

The present invention was accomplished in view of the aforementioned conventional problems, and an object of the present invention is to provide a resin molded article that eliminates a step of independently manufacturing a plurality of parts and assembling them and that facilitates the control of a clearance between the members at a low cost.

In order to accomplish the aforementioned object, a representative structure according to the present invention is so constituted that at least a first resin material and a second resin material, which are substantially insoluble (having substantially no compatibility) in one another are used and molded by insert molding or two-color molding, in a state where the first resin material and the second resin material are incorporated, and a clearance is produced between the first member and the second member.

In the structure as mentioned above, since there is substantially insolubility between the first member and the second member, each of the plural members, molded by insert molding or two-color molding, is to be separated in a state of being assembled. This, therefore, eliminates the necessity of steps for assembling a plural number of parts. In addition, by making a mold shrinkage factor differ between the first resin material and the second resin material, a clearance between the members can be controlled easily and with good accuracy.

Thus, a bearing part, roller part or drive unit, which is constituted of incorporated plural members, can be easily manufactured.

BRIEF DESCRIPTION OF THE DRAWINGS

The above and other objects and features of the invention are apparent to those skilled in the art from the following preferred embodiments thereof when considered in conjunction with the accompanied drawings, in which:

FIG. 1 is a view of a bearing; (a) is a front elevation of the bearing; and (b) is a perspective explanation view of the bearing;

FIG. 25 is a perspective explanation view showing another example of the slide unit;

FIG. 26 is a perspective explanation view showing yet another example of the slide unit;

DESCRIPTION OF THE PREFERRED EMBODIMENTS

Figure 2:
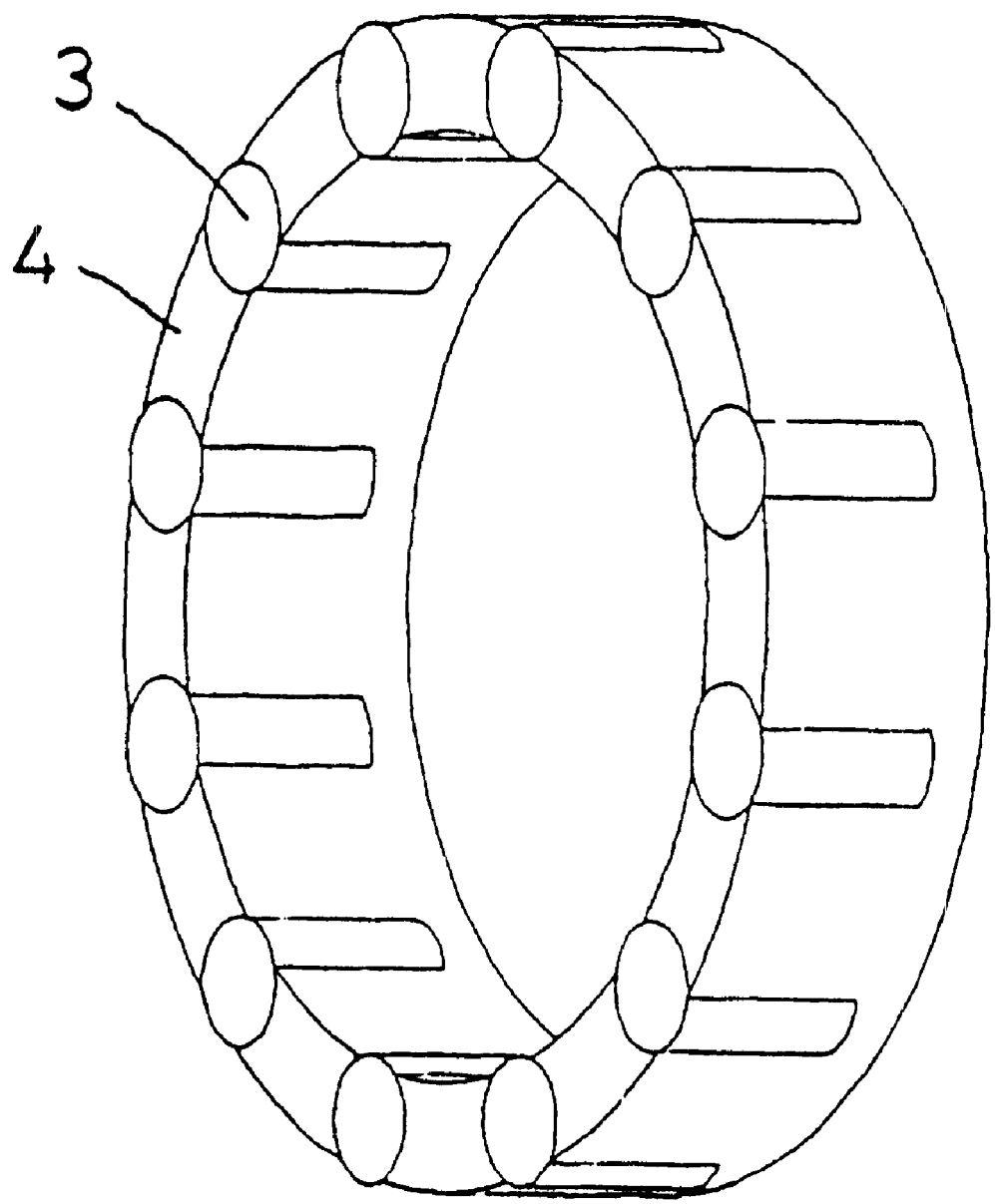
FIG. 2 is a perspective explanation view of a retainer retaining cylindrical rollers.

Next, referring to the drawings, resin molded articles according to respective embodiment of the present invention will be specifically described.

First Embodiment

First, shown is a case where the present invention is applied to a bearing as a first embodiment. FIG. 1 is a view showing a bearing; (a) is a front elevation view of the bearing; and (b) is a perspective explanation view of the bearing. FIG. 2 is a perspective explanation view of a retainer in which cylindrical rollers are retained.

As shown in FIG. 1, the bearing is provided with an inner ring member 1 having an inner ring track on an outer peripheral surface of the inner ring member 1; an outer ring member 2 having an outer ring track on an inner peripheral surface of the outer ring member 2; cylindrical rollers 3, as a plural number of roller members, provided between the inner ring track and the outer ring track in a freely rollable manner; and a retainer 4, as a housing member, provided between the inner ring track and the outer ring track in a freely rotatable manner in a state of retaining the plural number of the cylindrical rollers 3.

Molding can be made for forming the cylindrical rollers 3, the retainer 4, the outer ring member 2 and the inner ring member 1 by insert molding or two-color molding in a state as shown in FIG. 2, by using resin materials for the cylindrical rollers 3 and those for the retainer 4, the outer ring member 2, or the inner ring member 3 that are substantially insoluble in one another. Also, making a mold shrinkage factor of the material for the cylindrical rollers 3 larger than that of the material for the retainer 4 can secure a minute clearance of approximately 0.01 mm to 0.05 mm between the cylindrical roller 3 and the retainer 4, where the cylindrical rollers 3 are freely rotatable in a state of being retained by the retainer 4. Thus, the inner ring member 1 and the outer ring member 2 rotate smoothly through a plurality of the cylindrical rollers 3.

It is to be noted that, as a first resin material constituting the cylindrical rollers 3 being insoluble and having a different mold shrinkage factor, it is preferable to use polypropylene, POM or the like, having a larger mold shrinkage factor than that of a second resin material. As the second resin material constituting the retainer 4, it is preferable to use ABS, PS, polycarbonate or the like.

Figure 3:
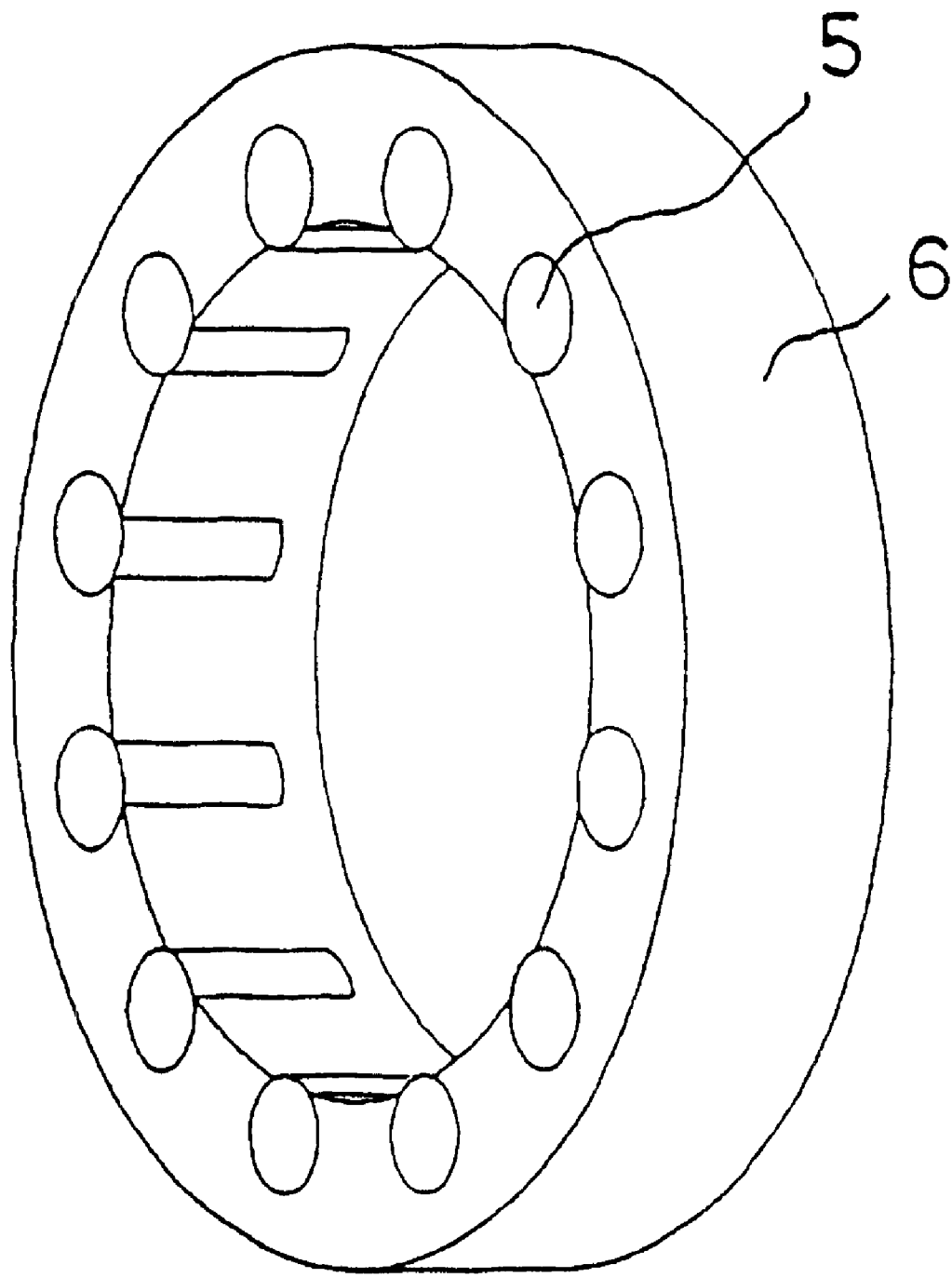
FIG. 3 is a perspective explanation view showing another example of a bearing of a first embodiment.

FIG. 3 is a perspective explanation view showing another example of the bearing of the first embodiment.

A bearing as shown in FIG. 3 is provided with cylindrical rollers 5 as a plural number of roller members, as well as with a retainer 6 as a housing member, retaining the cylindrical rollers 5 in a freely rotatable manner and having a cylindrical hollow portion, at the center, into which a shaft is designed to be fitted. Although each of the cylindrical rollers 5 is kept by the retainer 6 in a freely rotatable manner, a partial portion of the cylindrical roller 5 is designed to stick out to the cylindrical hollow portion of the retainer 6. Then, when the shaft (not shown) is fitted to the cylindrical hollow portion of the retainer 6, the partial portion of the cylindrical roller 5 is to protrude from an inner peripheral surface of the retainer 6. Thus, the inner peripheral surface of the retainer 6 is not directly contacted with the outer peripheral surface of the shaft. Instead, the cylindrical rollers 5 are contacted with the shaft (not shown).

The cylindrical rollers 5 and the retainer 6 can be produced by insert molding or two-color molding in a state as shown in FIG. 4 with the resin materials being substantially insoluble in one another. In addition, making a mold shrinkage factor of the material for the cylindrical rollers 5 larger than that of the material for the retainer 6 can rotate freely the cylindrical rollers 5 in a state of being retained by the retainer 6.

Thus, the retainer 6 concurrently serving as an outer ring member of the bearing and a shaft (not shown) fitting in the cylindrical hollow portion of the retainer 6 are to rotate smoothly through a plural number of the cylindrical rollers 5.

FIG. 4 is a partial cross-sectional explanation view showing yet another example of the bearing of the first embodiment of the present invention.

Figure 4A:
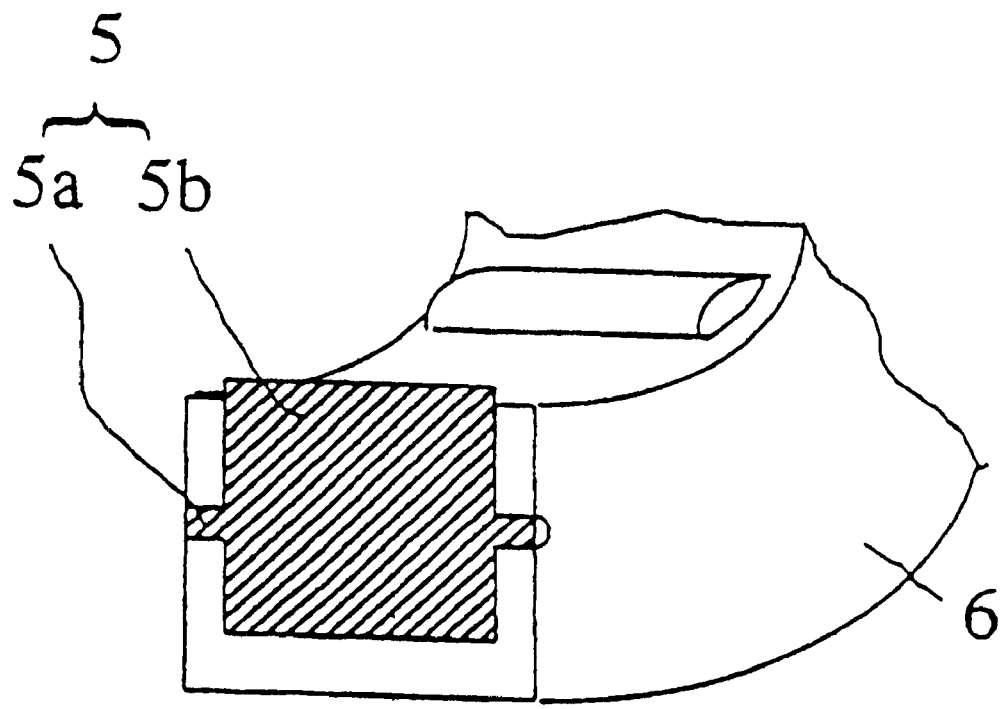
FIG. 4 is a partial cross-sectional explanation view showing yet another example of the bearing of the first embodiment.

As shown in FIG. 4(a), this embodiment is provided with a plural number of the cylindrical rollers 5 and the retainer 6, retaining the cylindrical rollers 5 in a freely rotatable manner, as well as having the cylindrical hollow portion, at the center, into which a shaft is fitted. The cylindrical roller 5 has stepped portions, consisting of roller shaft portions 5a, with a small diameter, that is axially supported with the retainer 6 and a roller portion 5b, with a large diameter, that is contacted with a shaft (not shown) fitted into the cylindrical hollow portion of the retainer 6.

Also in this embodiment, the cylindrical roller 5 and the retainer 6 are formed by insert molding or two-color molding, by using the resin materials that are substantially insoluble in one another. In addition, by making the mold shrinkage factor of the cylindrical roller 5 greater than that of the material for the retainer 6, the cylindrical roller 5 shrinks in both the shaft and radial directions to produce a minute clearance between the cylindrical roller 5 and the retainer 6, with the result that the cylindrical roller 5 can freely rotate in a state of being retained by the retainer 6.

Thus, by providing the cylindrical roller 5 with the stepped portions so that portions to be axially supported with the retainer are only limited to the roller shaft portions 5a having a smaller diameter than that of the roller portion 5b, a resistance against sliding between the cylindrical roller 5 and the retainer 6 can be further reduced.

Figure 4B:
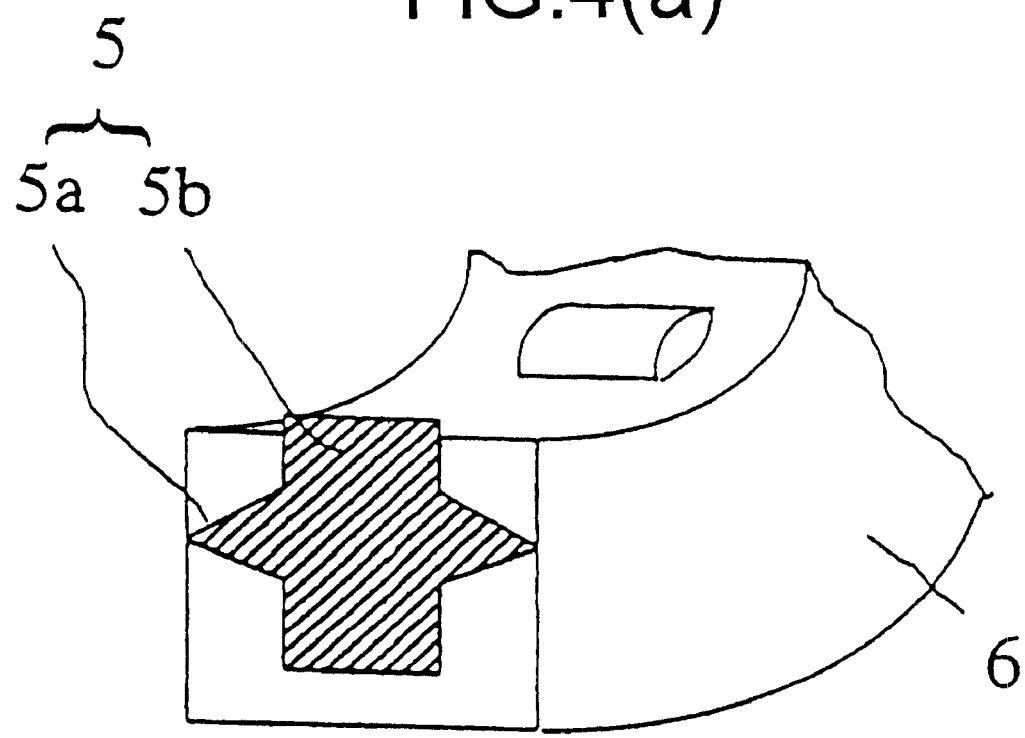

Furthermore, in order to make the resistance against sliding between the cylindrical roller 5 and the retainer 6 even smaller, the roller shaft portions 5a may have a conical shape as shown in FIG. 4(b).

Figure 5:
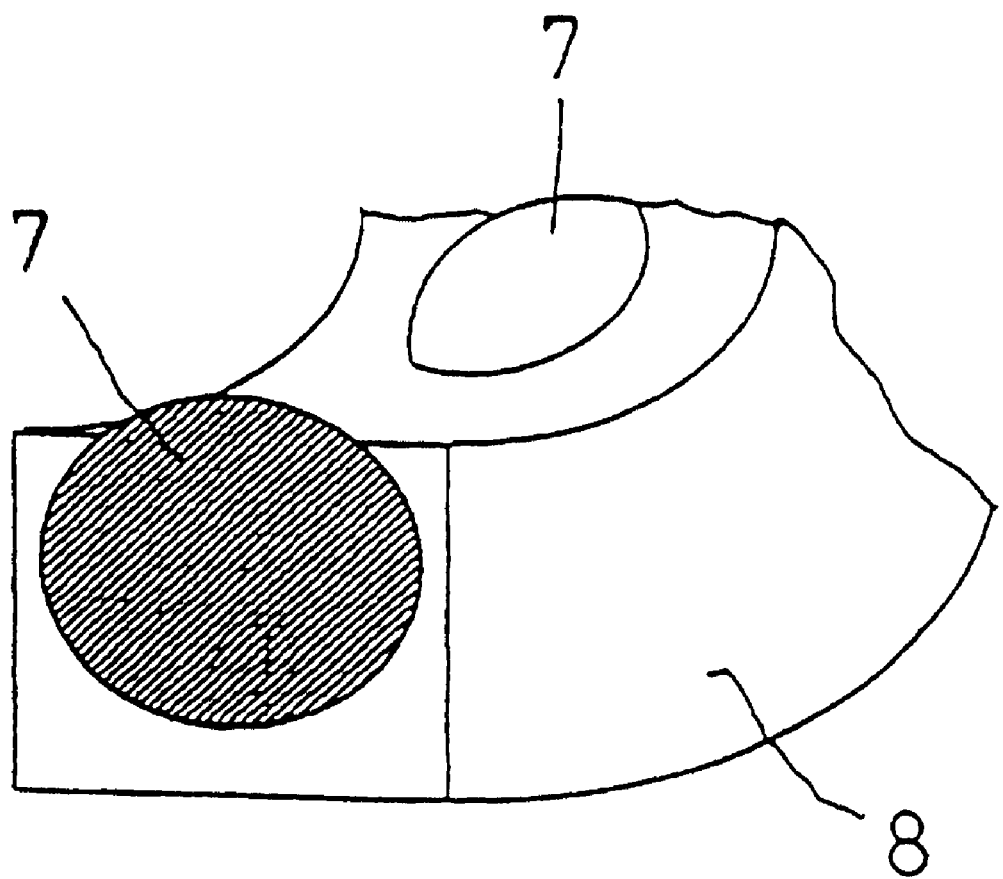
FIG. 5 is a partial cross-sectional explanation view showing still yet another example of the bearing of the first embodiment.

FIG. 5 is a partial cross-sectional explanation view showing yet another example of the bearing of the first embodiment. The bearing of the embodiment, as shown in FIG. 5, is constituted by assembling spherical balls 7 as a plural number of the roller members and a retainer 8, as a housing, retaining the balls 7 in a freely rotatable manner, as well as having a cylindrical hollow portion into which a shaft (not shown) is to be fit in the center.

Although the retainer 8 retains the balls 7 in a manner incapable of dropping as well as in a freely rotatable manner, a partial portion of the ball 7 is designed to stick out to the side of the cylindrical hollow portion of the retainer 8. When a shaft (not shown) is fitted into the cylindrical hollow portion of the retainer 8, a partial portion of the ball 7 is to protrude from an inner peripheral surface of the retainer 8, with the result that the inner peripheral surface of the retainer 8 is not directly contacted with an outer peripheral surface of the shaft. Instead, the balls 7 are contacted with the shaft (not shown).

The balls 7 and the retainer 8 are formed by insert molding or two-color molding by using the aforementioned materials that are substantially insoluble in one another. In addition, making a shrinkage factor of the material for the balls 7 greater than that of the material for the retainer 8 can make the balls 7 freely rotate while being retained by the retainer 8.

With this arrangement, the retainer 8 concurrently serving as an outer ring member of the bearing and the shaft (not shown) fitted into the cylindrical hollow portion of the retainer 8 can rotate smoothly through a plural number of the balls 7.

It is to be noted that radial bearings are exemplified in the aforementioned embodiments, but embodiments of thrust bearings can be structured in the same manner.

Second Embodiment

Next, an embodiment where the present invention is applied to a roller unit will be described as a second embodiment.

Figure 6:
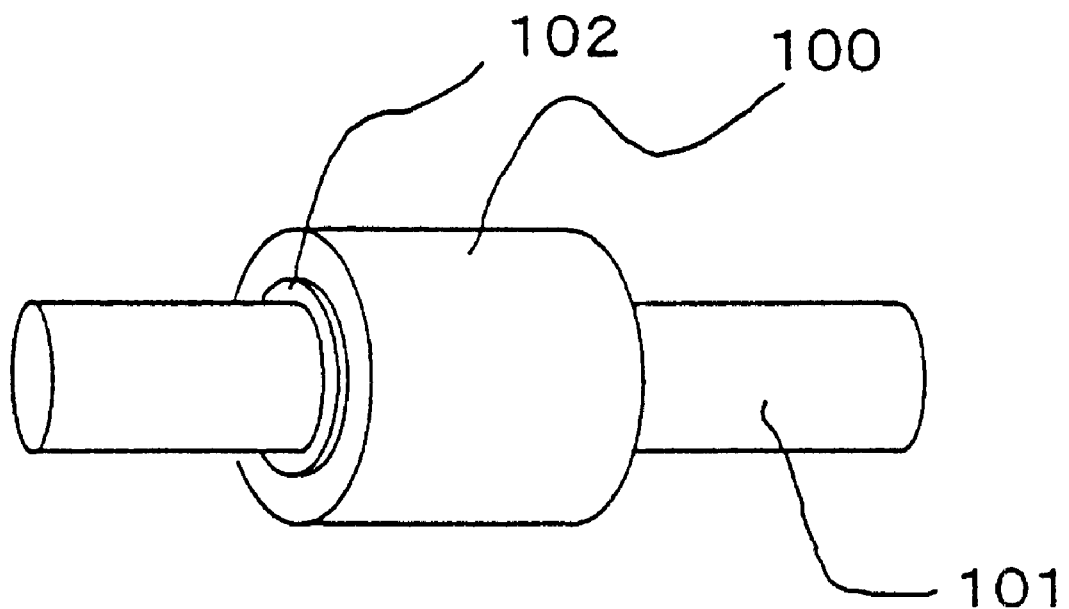
FIG. 6 is a perspective explanation view of a conventional roller unit.

FIG. 6 is a perspective explanation view of a conventional roller unit. As shown in FIG. 6, the roller unit for pressing a sheet on a conveying roller or the like is conventionally structured by manufacturing two parts, independently as a roller member 100 and a shaft member 101, which are later assembled. Then, a stop ring 102 is attached thereto in order for the roller member 100 not to slip in a shaft direction. This, however, results in an increase in cost, because such a method requires the assembling step.

Figure 7A:
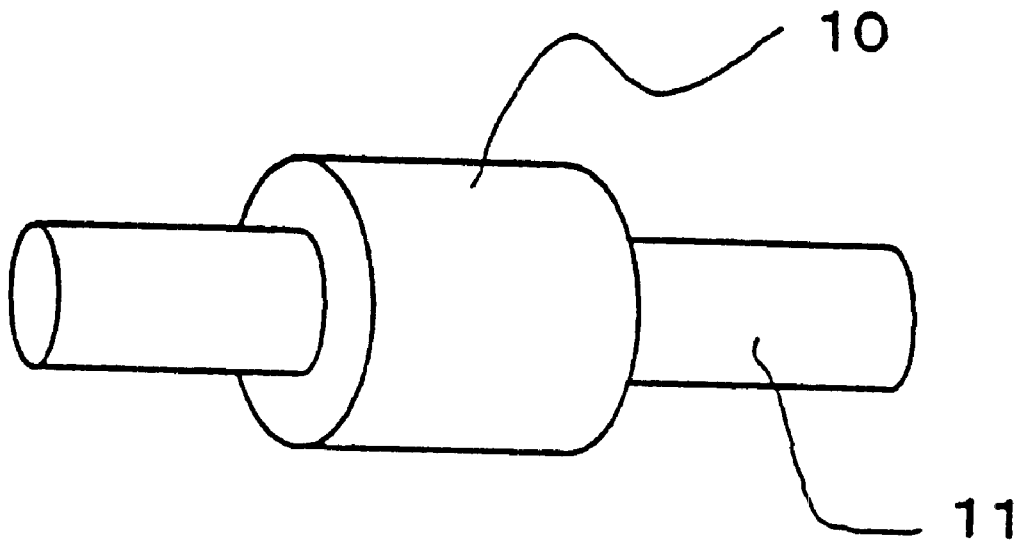
FIG. 7 is a view showing a roller unit according to a second embodiment; (a) is a perspective view; and (b) is a cross-sectional explanation view.
Figure 7B:
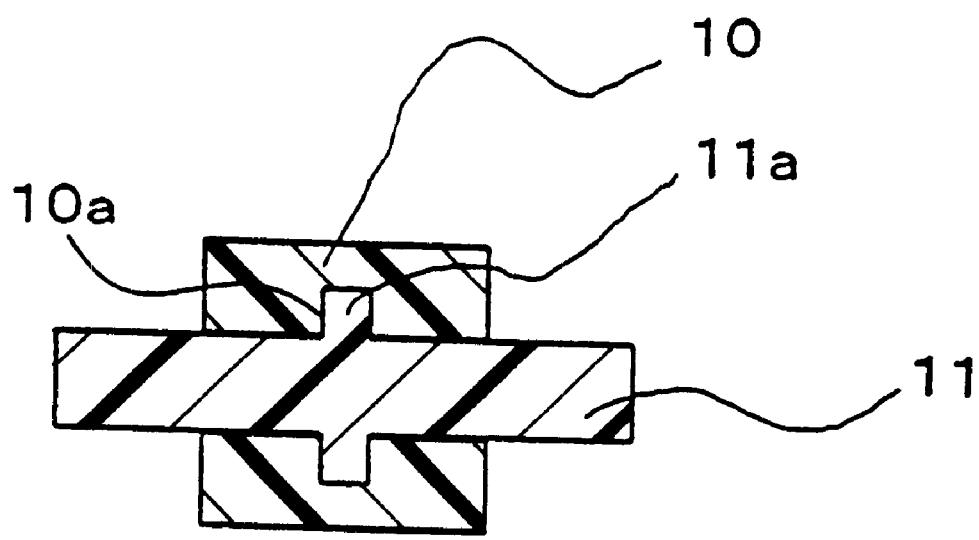

Here, as shown in FIG. 7, the present embodiment is formed by molding the roller member and the shaft member in an already assembled state. Incidentally, FIG. 7 is a view showing a roller unit according to the second embodiment; (a) is a perspective view; and (b) is a cross-sectional explanation view.

As shown in FIG. 7, a roller member 10 is rotatable around a shaft member. 11, where the shaft member 11 forms slip stopping portions 11a for preventing the roller member 10 from slipping in a shaft direction and the roller member 10 forms a fitted portions 10a for being fitted with the slip stopping portions 11a. As in a state shown in FIG. 7, the insert molding or two-color molding is carried out with a combination of resin materials that are substantially insoluble in one another. For example, a combination of a resin material for the roller member 10 having a smaller mold shrinkage factor, such as ABS, PS, polycarbonate or the like, can be used with a resin material for the shaft member 11 having a larger mold shrinkage factor, such as polypropylene, POM or the like, to produce a roller unit.

Since the mold shrinkage factor of the resin material selected for the shaft member 11 is greater than that of the resin material used for the roller member, after molding is completed, there is formed, between the roller member 10 and the shaft member 11, a minute clearance of approximately 0.01 mm to 0.05 mm, which is in a range capable of assuring the rotation of the roller member 10. Therefore, the roller member 10 is supported around the shaft member 11 in a freely rotatable manner.

In addition, a similar clearance is produced between the slip stopping portions 11a and the fitted portions 10a, so prevention of the roller member 10 from slipping in the shaft direction is achieved without disturbing the rotation of the roller member 10.

FIG. 8 is a cross-sectional explanation view showing another example of the roller unit of the second embodiment. In this example, a cylindrical elastic member 12 is provided on an outer peripheral cylindrical surface of the roller member 10.

Figure 8A:
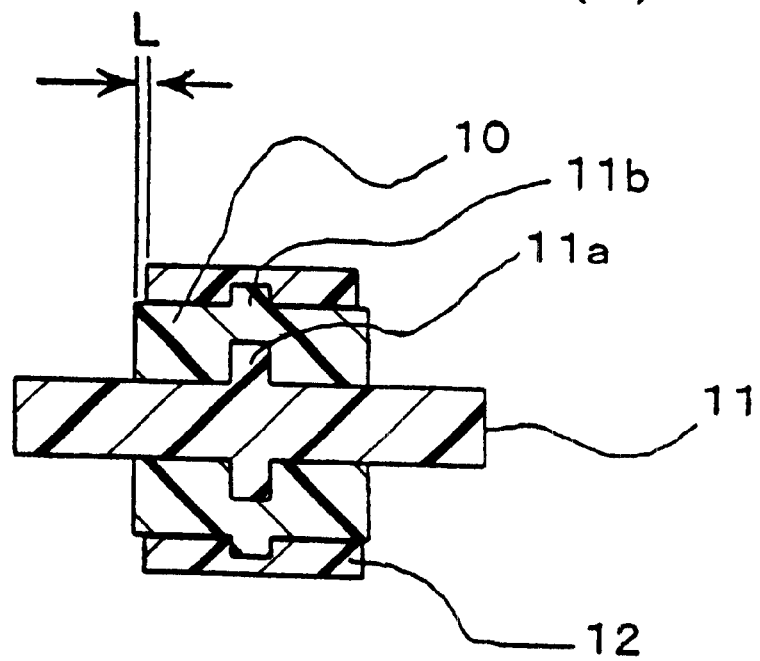
FIG. 8 is a cross-sectional explanation view showing another example of the roller unit of the second embodiment.

As for a rotation stopping of the roller member 10 and the elastic member 12, resin materials having compatibility with one another may be utilized for fixing; or even with the resin materials that are substantially insoluble in one another, protrusions 11b for the rotation stopping may be formed on the outer periphery of the roller member 10 as shown in FIG. 8(a). The material for forming the elastic member 12 is, for example, an elastomer or the like, which has a mold shrinkage factor greater than that of the material for forming the roller member 10. Therefore, after molding is completed, the elastic member 12 is to tighten the roller member 10. Thus, the rotation stopping becomes further strengthened.

Figure 8B:
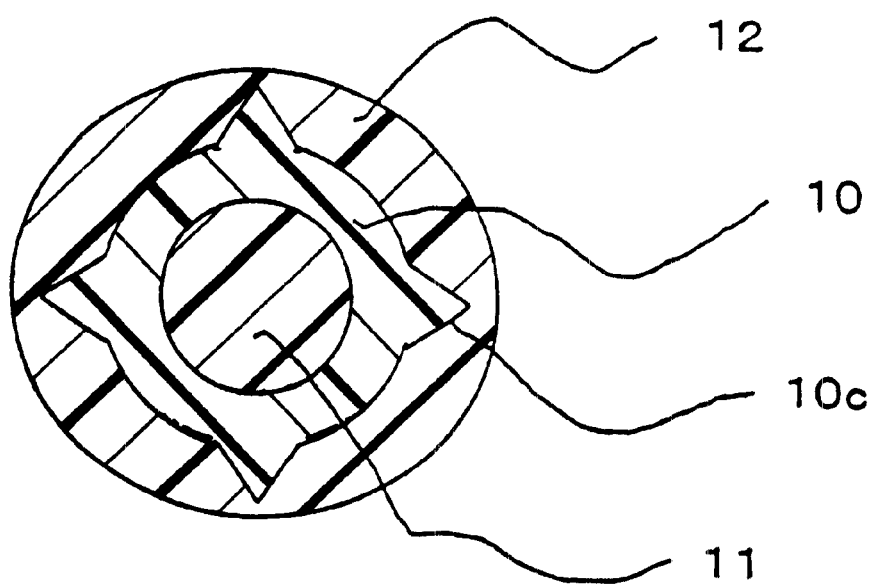

As for a stoppage in a thrust direction of the roller member 10 and the elastic member 12, resin materials that are soluble in one another may be utilized for fixing; or even with the resin materials that are substantially incompatible with one another, protrusions 10c for the thrust stopping may be formed in the roller member 10 as shown in FIG. 8(b).

Thus, as mentioned above, a roller unit is formed with a combination of resin materials that are substantially insoluble in one another at least for the roller member 10, the shaft member 11, the elastic member 12, which are provided by insert molding or three-color molding.

Since the mold shrinkage factor of the elastic member 12 is greater than that of the material for forming the roller member 10, a minute difference in level, indicated by L as shown in FIG. 8, is produced. Thus, when the roller member 10 is incorporated into a product, only the roller member 10 is in a frictional sliding movement with respect to the shaft member 11 and the elastic member 12 is not in a frictional sliding movement with respect to the shaft member 11. Especially in the case where the elastic member 12 is a friction member, an increase in a sliding load can be prevented.

It is to be noted that, as the elastic member 12, various types of materials such as those having an elasticity, high friction coefficient, low friction coefficient, water repelling ability, or the like are usable.

Third Embodiment

Next, an embodiment where the present invention is applied to a one-way clutch will be described as a third embodiment.

Generally, clutches used in power transmission systems include a one-way clutch for transmitting a rotary torque in one direction only, when a drive shaft is reversely rotated.

This construct is used in various types of apparatuses, such as image forming apparatuses.

The aforementioned one way clutch employs various types of structures. In a wrap spring type one-way clutch, for example, one end of a coiled spring is secured to a drive shaft, while the other end portion of the coiled spring is wrapped around a driven shaft, and a torque is transmitted by winding the coiled spring in a forward rotation. The coiled spring is relaxed to be freely rotatable in a reverse rotation. In a roller type one-way clutch, a portion of an outer peripheral surface of an inner ring member and a portion of an inner peripheral surface of an outer ring member are designed to approach each other in a peripheral direction. A roller forced by the spring is interposed therebetween, where, in a forward rotation, the roller is moved, resisting the spring is force, to be fitted between both rings, thus to transmit a torque. In a reverse rotation, the roller becomes free.

In order to manufacture the one-way clutches as mentioned above, plural assembly steps are required to put together respective parts after those parts are molded independently.

Figure 9:
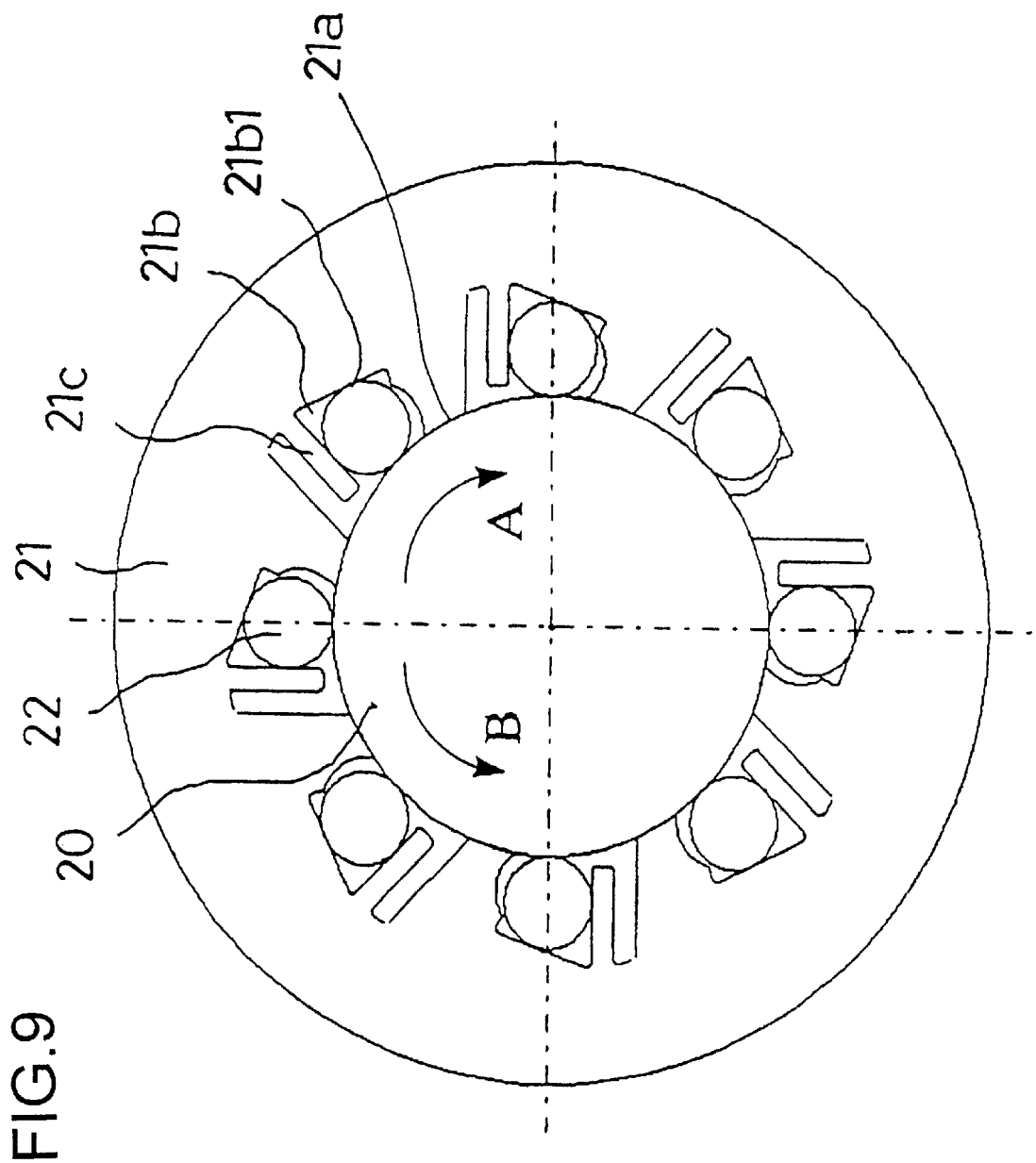
FIG. 9 is a front elevation explanation view of a one-way clutch according to a third embodiment.
Figure 10:
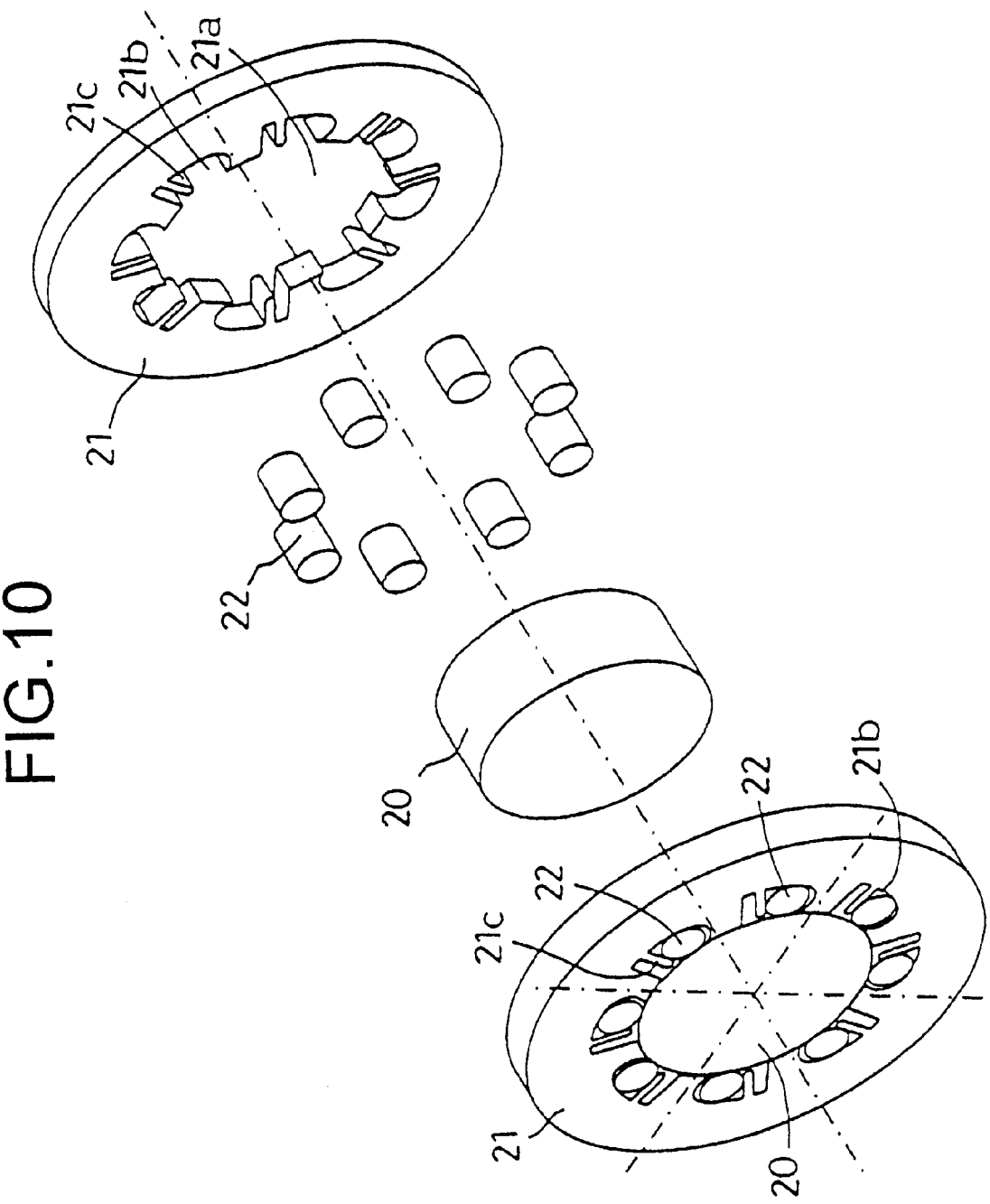
FIG. 10 is a perspective explanation view of the one-way clutch.

In the present invention, as shown in FIG. 9, roller members having a cylindrical shape respectively, as well as a housing member including retainer portions for retaining the roller members and, at its center, a fitted portion to which a shaft is to be fitted are formed by insert molding or two-color molding in an already assembled state, thereby eliminating the necessity of the assembling steps. FIG. 9 is a front elevation of a one-way clutch according to the third embodiment, and FIG. 10 is a perspective explanation view of the one-way clutch.

In the one-way clutch of the present embodiment, a drive force is inputted from an input shaft 20 to be outputted to a housing member 21 as an outer ring member of the one-way clutch.

The housing member 21 forms a fitted portion 21a to which the input shaft 20 to be fitted and retainer portions 21b for retaining cylindrical roller members 22, which can freely rotate at the retainer portions 21b. The roller members 22 are formed by insert molding or two-color molding, using a resin material that is substantially insoluble in the housing member 21. In addition, by using the material for the roller member 22 having a greater mold shrinkage factor than that of the material for housing member 21, the housing member 21 retains the roller members 22 with a slightly uneven surface.

When the input shaft 20 is fitted to the fitted portion 21a, the retainer portion 21b is structured so that a distance between an inside wall surface 21b1 and the input shaft 20 is to be shorter than the diameter of the roller member 22 in one side (locked side) and longer in the other side (unlocked side) with respect to the rotating direction. In addition, the housing member 21 is provided with elastic members 21c for forcing the roller members 22 into the locked side of the inside wall surface 21b1 of the retainer portion 21b, and the same material as that of the housing member 21 is used for the elastic members 21c and it is molded integrally and simultaneously with the housing member 21.

Figure 11:
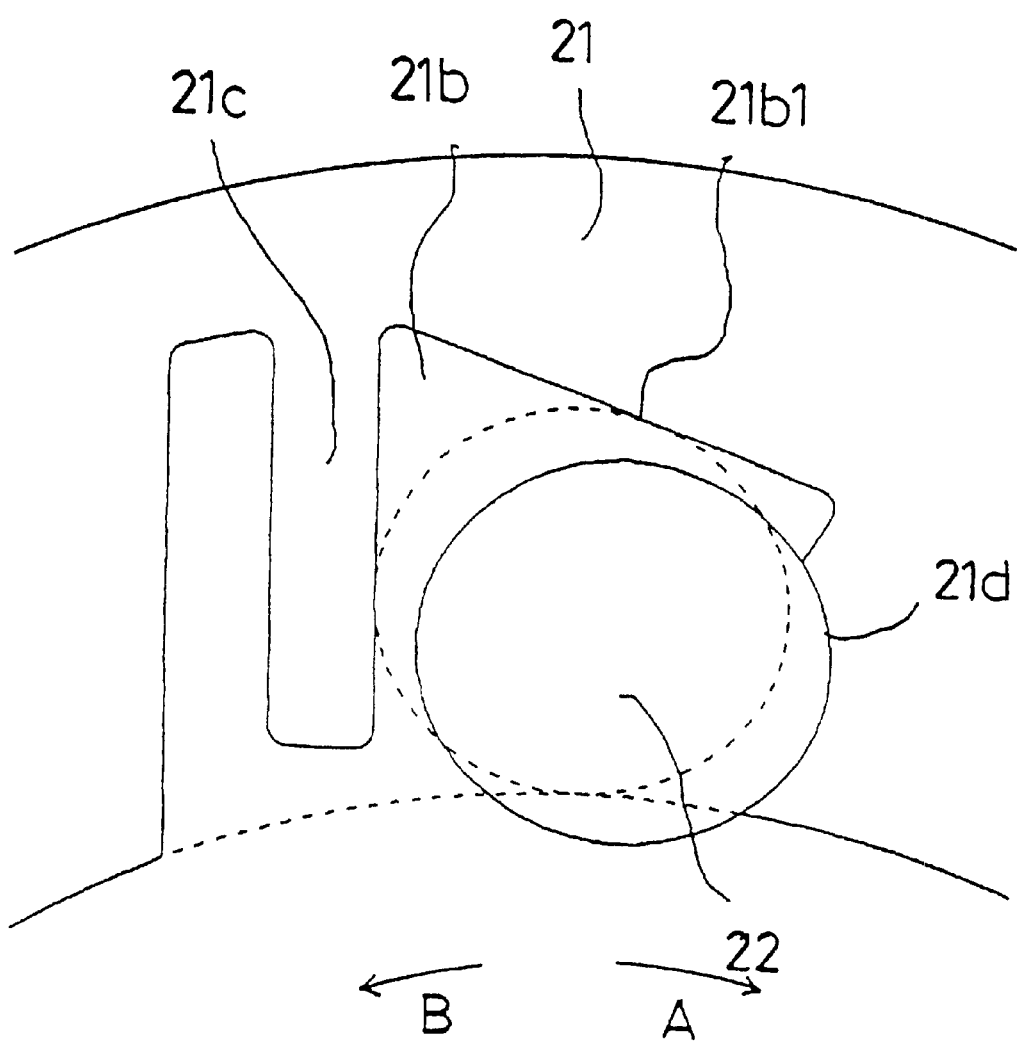
FIG. 11 is an enlarged explanation view showing one roller member 22 at the time of forming the roller members 22 and a housing member 21 by insert molding or two-color molding.

FIG. 11 is an enlarged explanation view of one roller member 22 when the roller members 22 and the housing member 21 are formed by insert molding or two-color molding. Although the roller member 22 and the housing member 21 are in contact with each other at a contacting portion 21d, since they are molded from resin materials that are substantially insoluble in each other, the roller member 22 is detached from the housing member 21 after molding is completed. At the time of driving, the roller member 22 is designed to exist in a position indicated by a dotted line in FIG. 11.

When the driving force is inputted into the input shaft 20 and the input shaft 20 is rotated in a direction indicated by arrow A in FIG. 11, each of the roller members 22 in the retainer portion 21b becomes sandwiched in the narrow, locked side between the inside wall surface 21b1 and the input shaft 20, and then the input shaft 20 and the housing member 21 are in a locked state. Due to this, the driving force is transmitted from the input shaft 20 through the respective roller members 22 to the housing member 21, and the housing member 21 is to be rotated in the same direction.

On the other hand, when the input shaft 20 receives the driving force to move in a direction indicated by arrow B in FIG. 11, each of the roller members 22 tends to move to the wider unlocked side between the inside wall surface 21b1 and the input shaft 20, and the roller member 22 comes to be in a unlocked state, capable of freely rotating in the retainer portion 21b. Therefore, the input shaft 20 runs idle without transmitting the driving to the housing member 21.

As mentioned above, by forming the roller members 22 and the housing member 21 by insert molding or two-color molding with the use of the resin materials that are substantially insoluble in one another, a predetermined space between the roller member 22 and the housing member 21, is secured in order to achieve the molded article in an already assembled state. Therefore, the one-way clutch can be easily manufactured.

Figure 12:
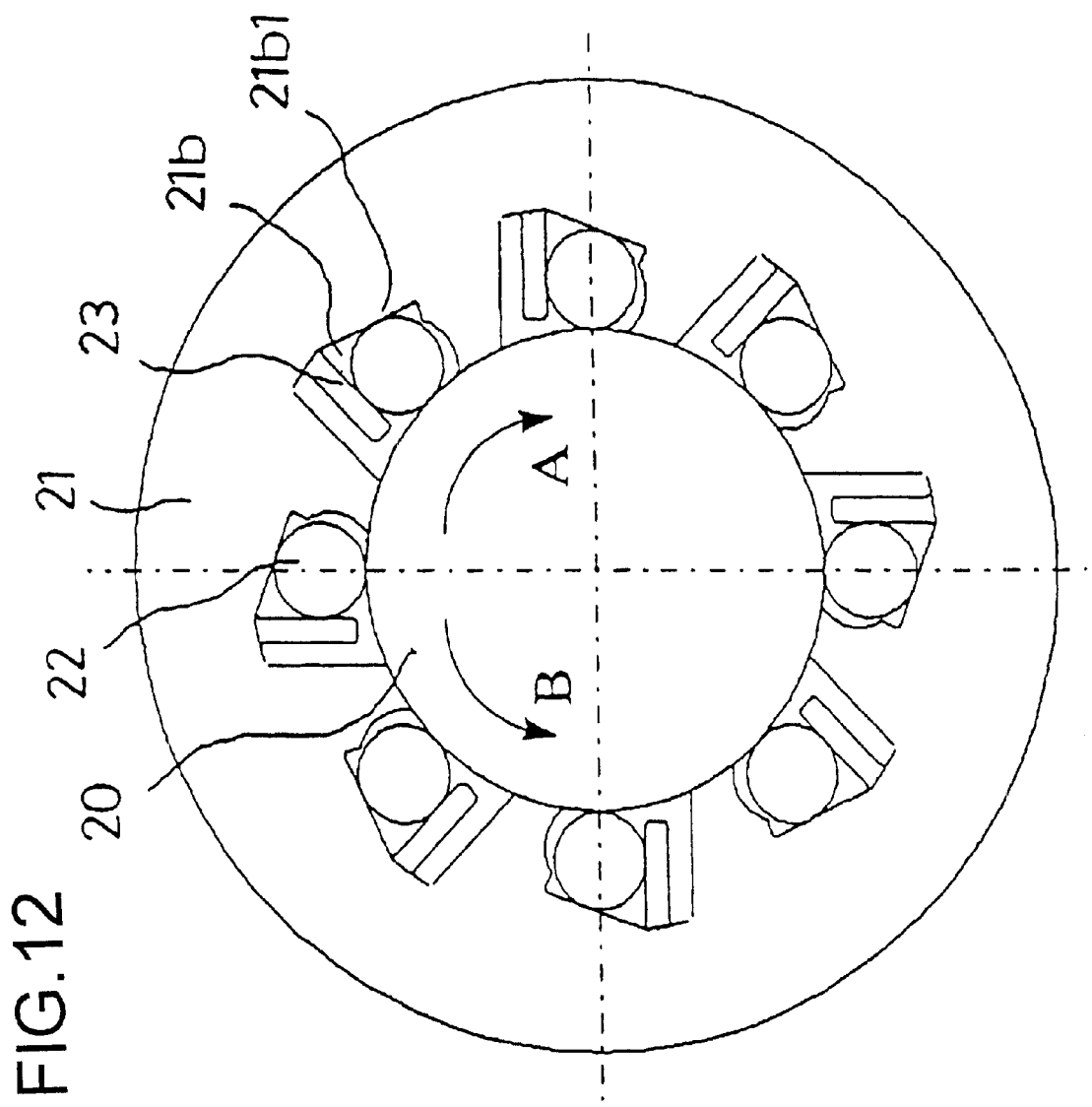
FIG. 12 is a cross-sectional explanation view showing another example of the one-way clutch of the third embodiment.

FIG. 12 is a cross-sectional explanation view showing another example of the one-way clutch of the third embodiment. The one-way clutch shown in FIG. 12 is formed, in the same manner as that in FIG. 9, by insert molding or two-color molding with the use of the resin materials that have substantially no compatibility with one another.

In the aforementioned one-way clutch, the elastic member 21c for forcing the roller member to the locked side is formed with the same material as that of the housing member and molded integrally therewith. In this example, on the other hand, an elastic member 23 for forcing the roller member 22 to the locked side is formed by two-color molding with a resin material, which is soluble (has compatibility) with the housing member 21, but is of a different kind. Thus, a material having an elasticity suitable for the function of forcing the roller member 22 to the locked side of the retainer portion 21b can be used for the elastic member 23.

Figure 13:
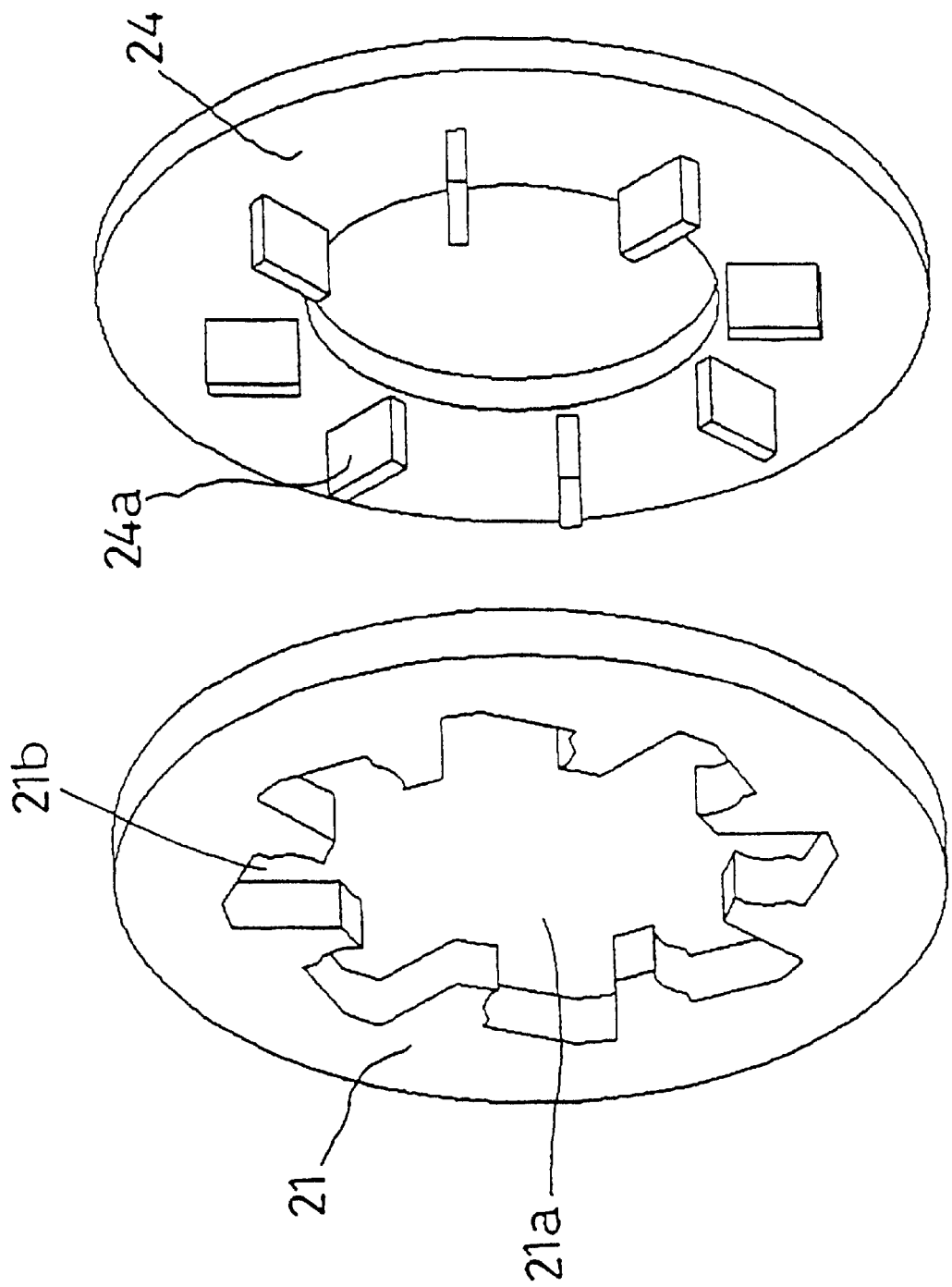
FIG. 13 is a perspective explanation view showing further another example of the one-way clutch of the third embodiment.

In addition, FIG. 13 is a perspective explanation view showing yet another example of the one-way clutch of the third embodiment. In this one-way clutch, elastic members 24a are integrally molded with a frame 24, which is separated from the housing member 21, and the elastic members 24a (and the frame 24) and the housing member 21 are molded, by two-color molding, from the resin materials that are substantially insoluble in one another. With this configuration, the same effects can be obtained as those in the aforementioned embodiments.

Fourth Embodiment

Figure 14:
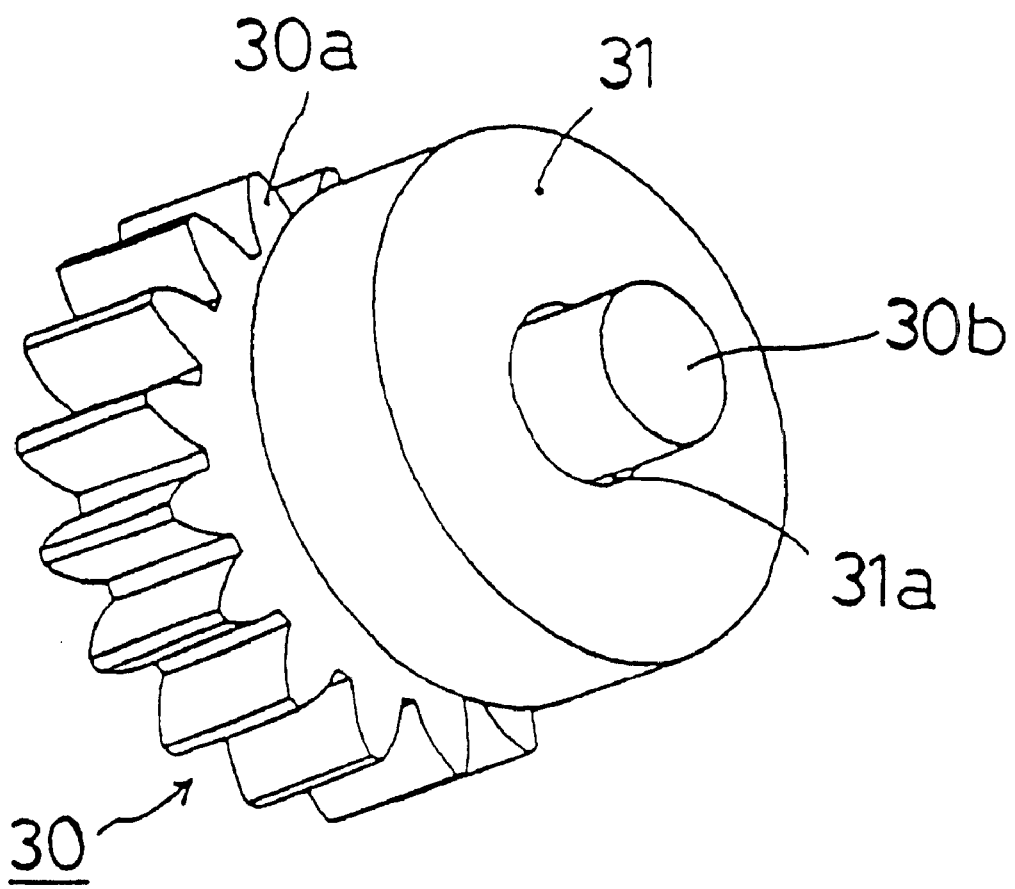
FIG. 14 is a perspective explanation view of a drive unit according to a fourth embodiment.

Next, an embodiment where the present invention is applied to a drive unit will be described as a fourth embodiment. FIG. 14 is a perspective explanation view of the drive unit according to the fourth embodiment.

In FIG. 14, a gear member 30 has a shape in which a shaft portion 30b having a common center with a gear portion 30a is protruding. A bearing member 31 is provided with a hollow portion 31a placed so as to be engaged with the shaft portion 31b. With this configuration, the gear, retained by the bearing member 31, becomes rotatable. The drive unit constituted of the gear member 30 and the bearing member like. 31 is used in various types of apparatuses such as an image forming apparatuses or the As for the two members of the drive unit, used are the resin materials being substantially insoluble due to their different melting points or the like. The materials having no compatibility include, for example, a polybutylene and polystyrene, and the like. With these materials, two-color molding by injection molding is carried out. At this time, the materials in use are so selected that a mold shrinkage factor of the gear member 30 is greater than that of the bearing member 31. Due to this, after the molding is completed, there is obtained, between the gear member 30 and the bearing member 31, a clearance that can assure the rotation of the gear member 30. In FIG. 14, the clearance is shown as being larger so as to make sure that the shaft portion 30b of the gear member 30 is inserted into the bearing member 31. Practically however, the clearance is desirably set from 0.01 mm or higher to 0.1 or lower.

By carrying out the insert molding or two-color molding in a state shown in FIG. 14, the drive unit with two assembled members can be manufactured at one time. Also, the step of assembling the members after molding can be eliminated. The drive unit thus formed can be used widely as a part of a torque transmission drive of a respective mechanical apparatus.

Figure 15:
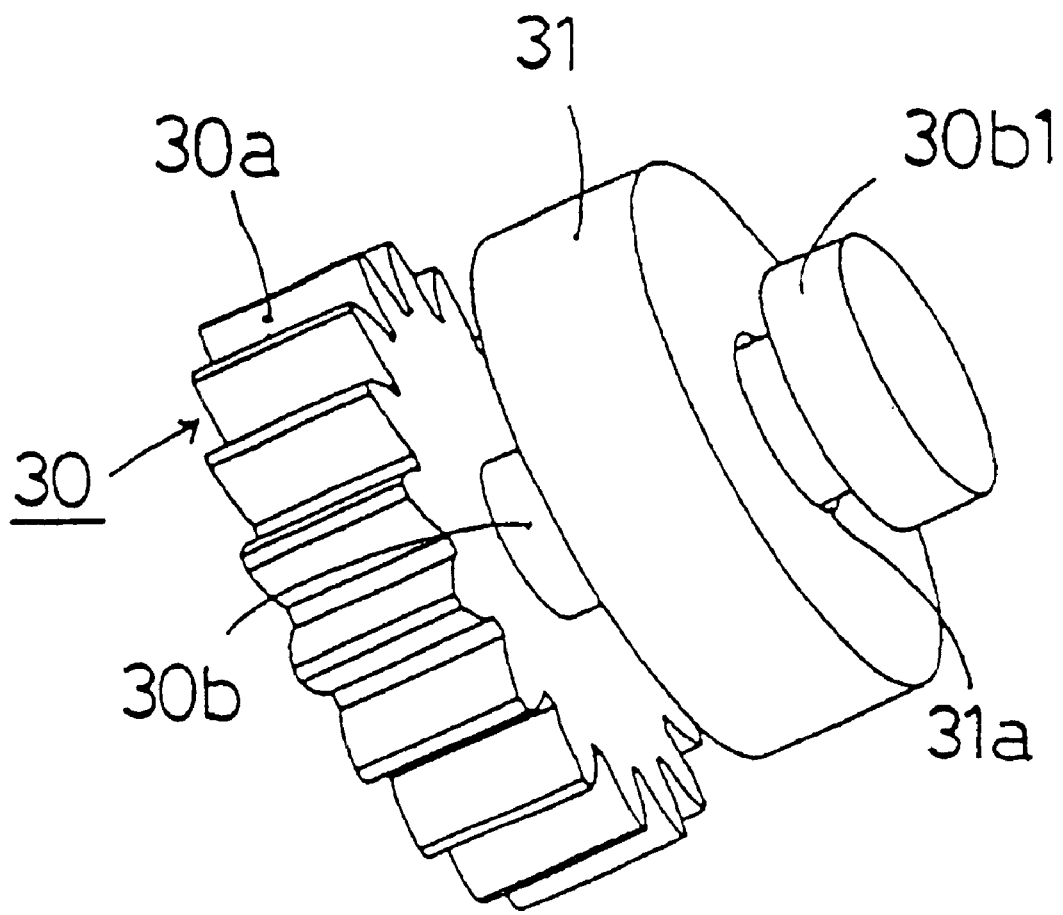
FIG. 15 is a perspective explanation view showing another example of the drive unit of the fourth embodiment.

FIG. 15 is a perspective explanation view showing another example of the drive unit of the fourth embodiment. The drive unit shown in FIG. 15 is constituted of the gear member 30 and the bearing member 31. This embodiment has a different point from the embodiment shown in FIG. 14 in that a diameter of the tip of the shaft portion of the gear member 30 is made larger to form a slip stopping portion 30b1.

The slip stopping portion 30b1 has a function of preventing the gear member 30 from slipping down after the gear member 30 hits the wall of the bearing member 31 when moving from side to side. Generally, it is difficult for the drive unit having this type of shape to be provided with a slip stopping shape of sufficient strength. This is because the slip stopping structure, if it is formed, becomes a hindrance when the gear member is incorporated, causing that the gear member not to be incorporated or leading to the gear member not being provided with sufficient strength. In order to deal with this problem, a slip stopping member is added, and the bearing member is incorporated into the gear member, and thereafter the slip stopping member is assembled, thereby increasing the number of the assembly steps.

In the present invention, on the other hand, molding can be carried out by insert molding or two-color molding in a state of being incorporated, and therefore the drive unit with the number of parts and the number of assembly steps greatly reduced can be provided.

Figure 16:
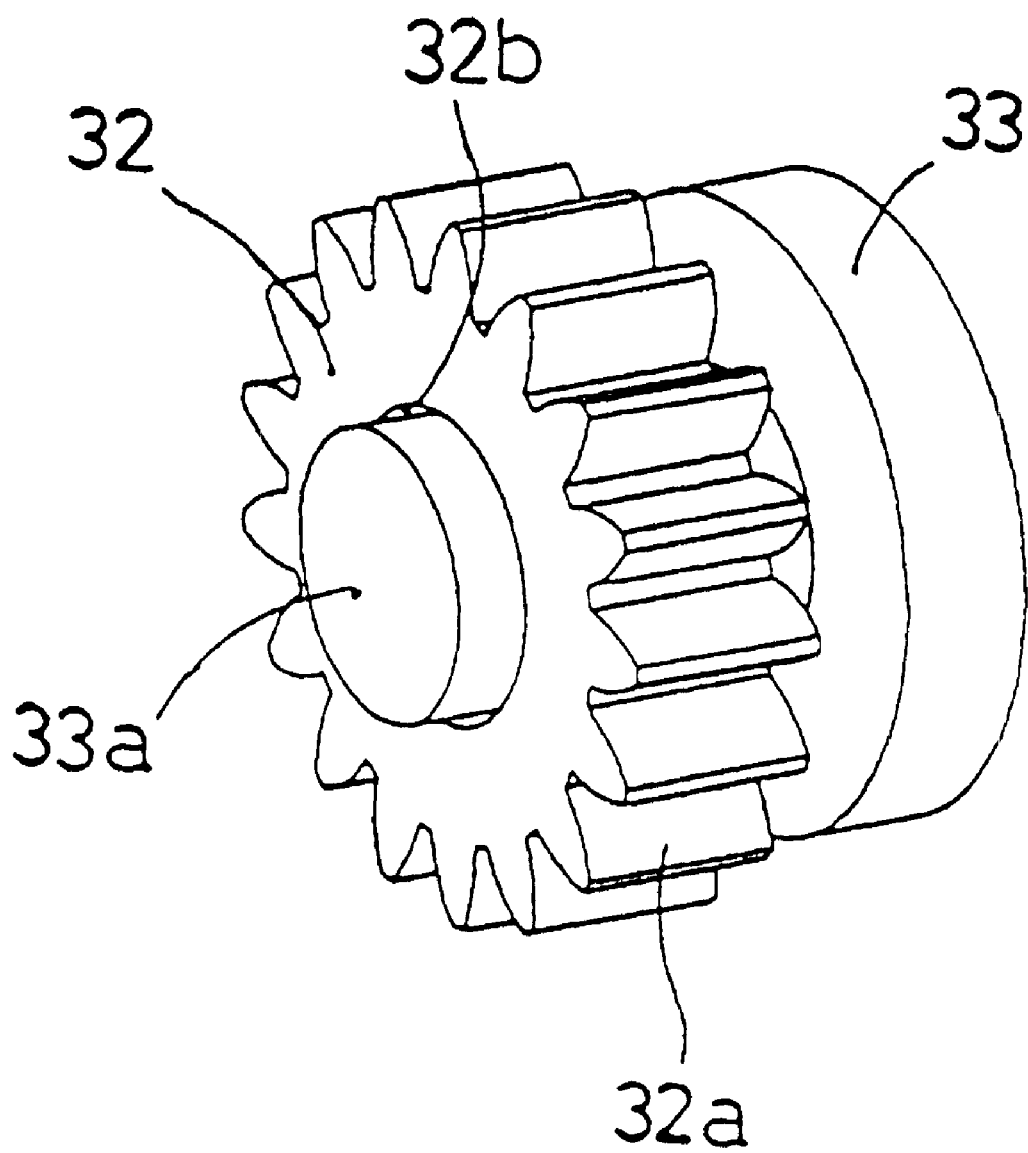
FIG. 16 is a perspective explanation view showing yet another example of the drive unit of the fourth embodiment.

FIG. 16 is a perspective explanation view showing yet another example of the drive unit of the fourth embodiment. The drive unit shown in FIG. 16 has a different point from the embodiment shown in FIG. 14 in that the gear member forms a hollow portion and the bearing member forms a shaft portion.

In other words, in this embodiment, the gear member 32 includes a gear portion 32a and a hollow portion 32b having a common center with the gear portion 32a. The bearing member 33 is, on the other hand, provided with a shaft portion 33a which is designed to engage the hollow portion 32b. As for materials used for the respective members, in the same manner as in the aforementioned drive unit in FIG. 14, usable are such materials that are substantially insoluble (for example, a polybutylene and polystyrene, or the like) due to their different melting, points, or the like. Then, with these materials, insert molding or two-color molding by injection molding is carried out.

Contrary to the case of the drive unit in FIG. 14, the materials for use in this embodiment are so selected that a mold shrinkage factor of the bearing member 33 is larger than that of the gear member 32. Due to this, after the molding is completed, there is obtained, between the gear member 32 and the bearing member 33, a clearance, which can assure the rotation of the gear member 32. Thus, by carrying out insert molding or two-color molding, manufacturing can be achieved without the need for assembly, with the plural members being incorporated.

Figure 17:
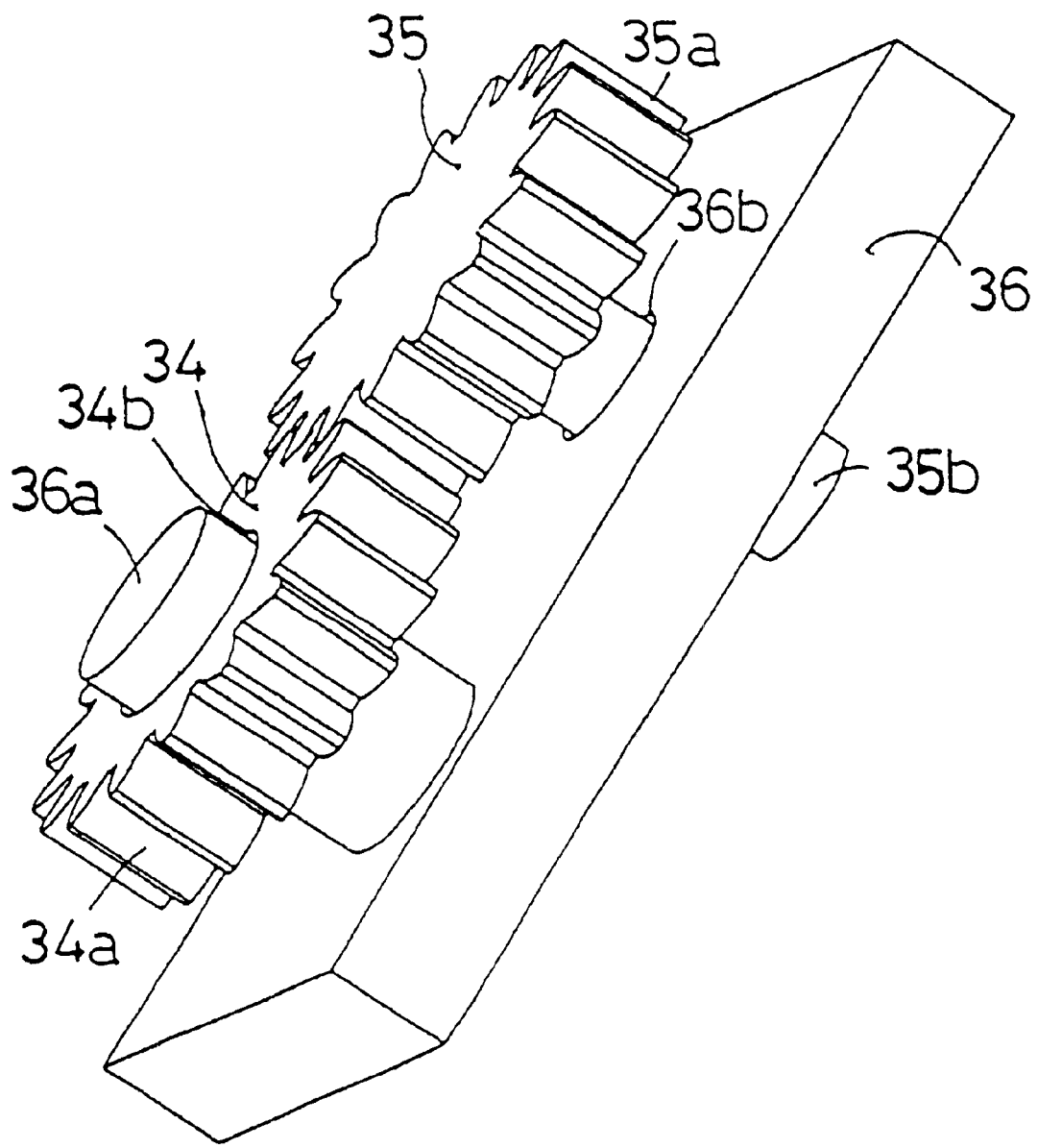
FIG. 17 is a perspective explanation view showing still yet another example of the drive unit.

FIG. 17 is a perspective explanation view showing yet another example of the drive unit. The drive unit shown in FIG. 17 is a drive unit using plural numbers of gears.

In other words, a first gear member 34 is constituted of a gear portion 34a and a hollow portion 34b having a common center with the gear portion 34a. A second gear member 35 is constituted of a gear portion 35a and a shaft portion 35b having a common center with the gear portion 35a. Further, a base member 36 is structured so as to support both gear members in a position where the first gear member 34 and the second gear member 35 are engaged.

The base member 36 is provided with a shaft portion 36a in a protruding manner in a position opposite to the first gear member 34, so the shaft portion 36a is engaged with the hollow portion 34b of the first gear member 34. The base member 36 is further provided with a hollow portion 36b in a position opposite to the second gear member 35, so the shaft portion 35b of the second gear member 35 is structured to engage the hollow portion 36b. Thus, the first gear member 34 and the second gear member 35 are rotatably retained by the shaft portion 36a and the hollow portion 36b of the base member 36, respectively.

The base member has a function of controlling a distance between the shafts of the first gear member 34 and the second gear member 35, as well as of retaining both gear members 34 and 35. Thus, there can be formed a drive unit usable in the various types of apparatuses and constituted of gear series and a base member for retaining the gear series.

Here, the materials used for the three members of the drive unit are those that are substantially insoluble due to their different melting points. The materials having substantially no compatibility are, for example, polybutylene and polystyrene, as mentioned above. Then, with the use of these resin materials, a three-color molding by injection molding is carried out.

At this time, the three kinds of the materials are selected to have mold shrinkage factors such that the first gear member has a mold shrinkage factor smaller than the base member and the mold shrinkage factor of the base member is smaller than that of the second gear member (the first gear member <the base member <the second gear member). Thus, after molding is completed, there are obtainable a clearance between the hollow portion 34b of the first gear member 34 and the shaft portion 36a of the base member 36, as well as a clearance between the hollow portion 36b of the base member 36 and the shaft portion 35b of the second gear member 35. These clearances can assure the rotation of the respective gears. It is to be noted that a value of the clearance may be the same as that in the aforementioned drive unit in FIG. 14.

With this arrangement, a gear series unit engaging the plural gear members can be molded by three-color molding or the concurrent use of insert molding and two-color molding in an already assembled form thereby capable of greatly decreasing the number of parts and the number of assembly steps.

Figure 18:
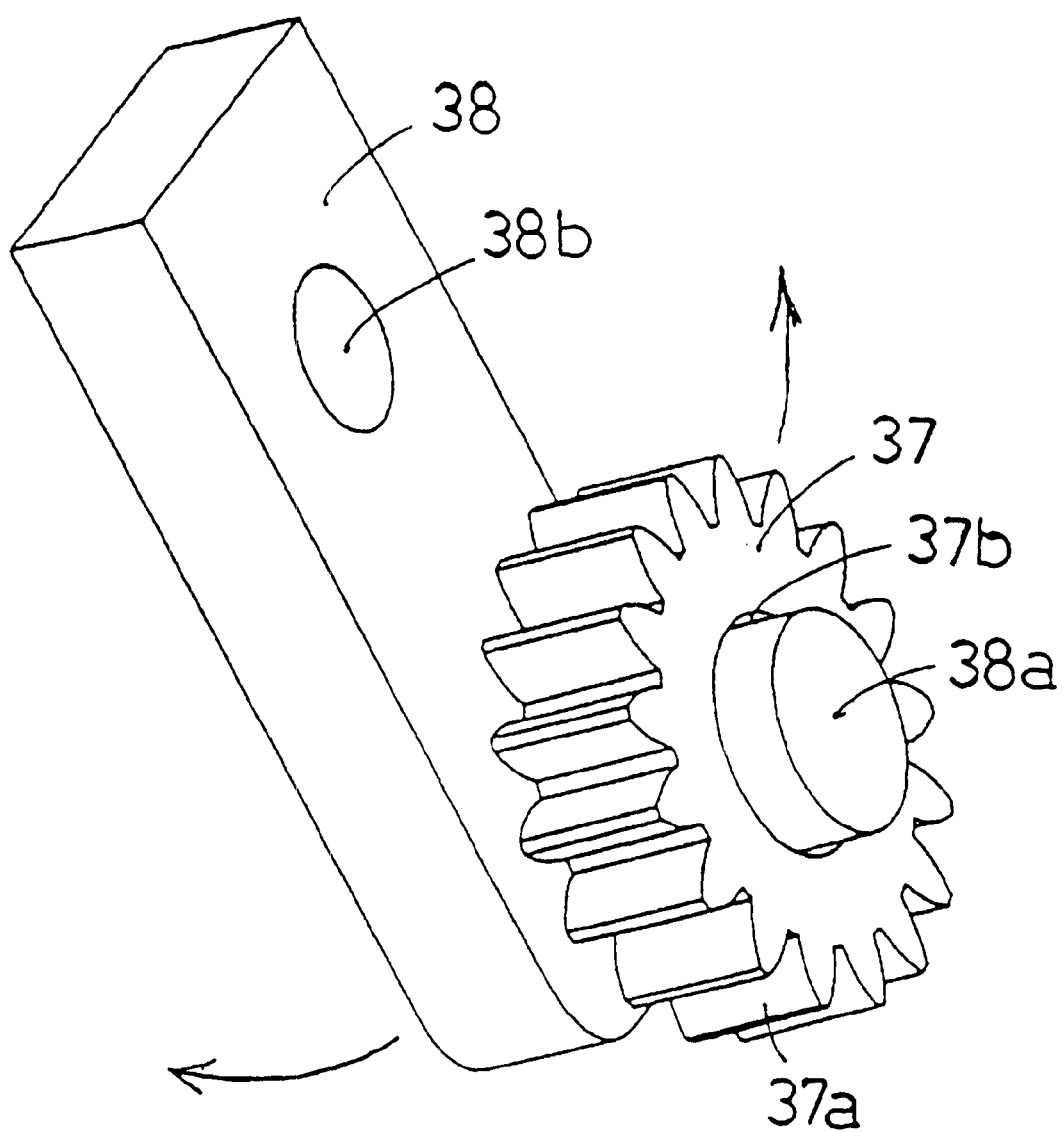
FIG. 18 is a perspective explanation view of a pendulum gear unit as another example of the drive unit.

FIG. 18 is a perspective explanation view of a pendulum gear unit shown as still further example of the drive unit. This unit is constituted of a gear member 37 having a gear portion 37a and a hollow portion 37b, which has the same center with the gear portion 37a, and a base member 38 having a shaft portion 38a designed to be fitted into hollow portion 37b. By making the shaft portion 38a fit into the hollow portion 37b, the gear member 37 can be rotated. In addition, the base member 38 forms the hollow portion 38b, and, when a shaft (not shown) or the like is fitted into this hollow portion 38b, thus to retain the base member 38, the base member 38 becomes rotatable on the hollow portion 38b as a center in the directions indicated by arrows in FIG. 18. Consequently, the gear member 37 functions as a pendulum gear.

Here, the materials used for the gear member 37 and the base member 38 are such that they are substantially insoluble due having different melting points, or the like. Then, the materials are selected so that a mold shrinkage factor of the base member 38 is greater than that of the gear member 37. With this arrangement, in the same manner as in the embodiments mentioned above, molding can be carried out by insert molding or two-color molding so that the gear member 37 and the base member 38 are already incorporated and a predetermined clearance is obtained at the rotating portion.

Figure 19:
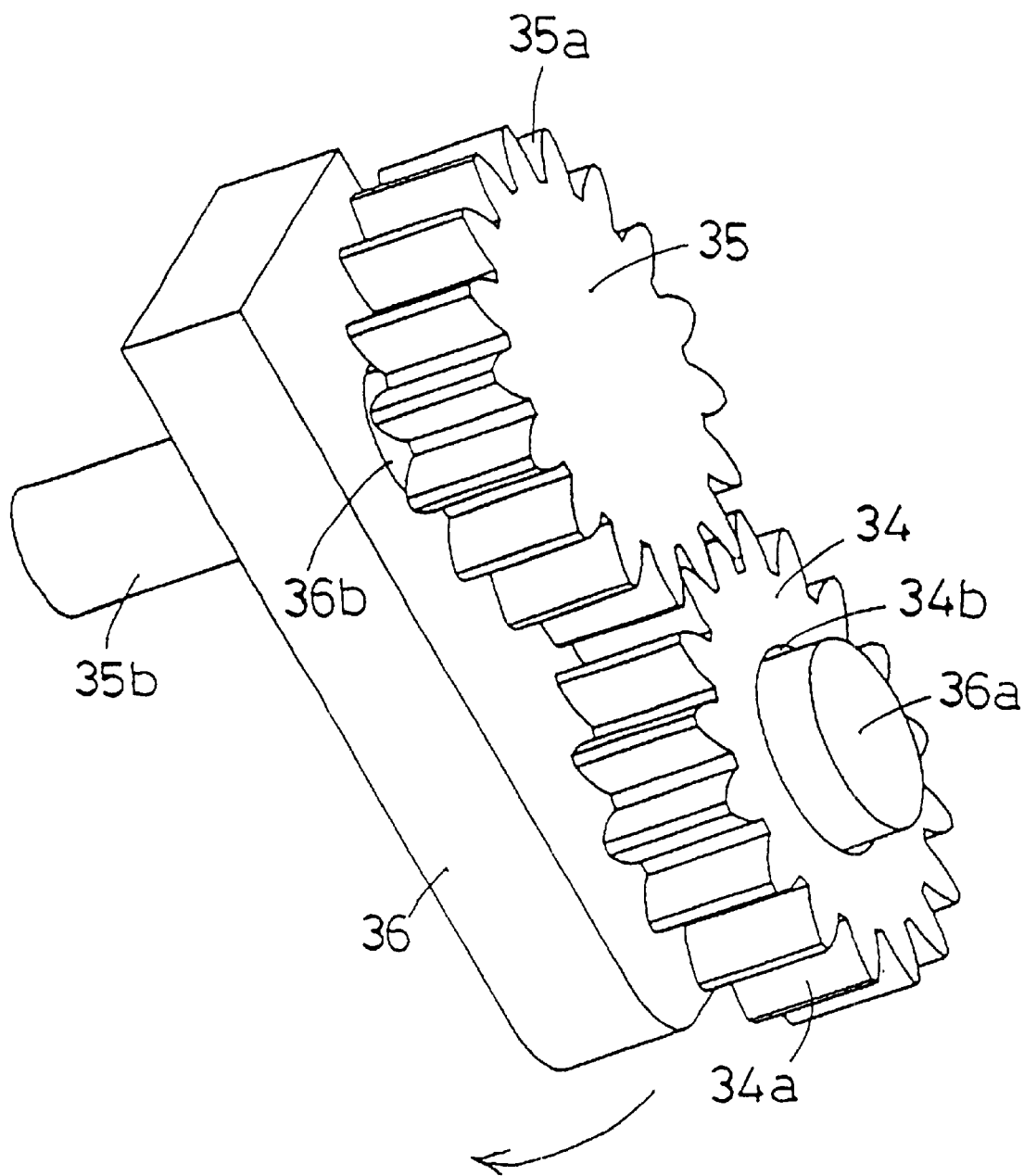
FIG. 19 is a perspective explanation view of a pendulum gear unit as another example of the drive unit.

FIG. 19 is a perspective explanation view of a pendulum gear unit shown as a still further example of the drive unit. This unit is provided by extending the shaft portion 35b of the second gear member 35 of the gear series unit shown in FIG. 17 to make the base member 36 swingable on the shaft portion 35b as a center in a direction indicated by an arrow in FIG. 19, thereby serving as a pendulum gear unit. Thus, the pendulum gear unit with the plural gear members engaged can be easily manufactured.

Fifth Embodiment

Figure 20A:
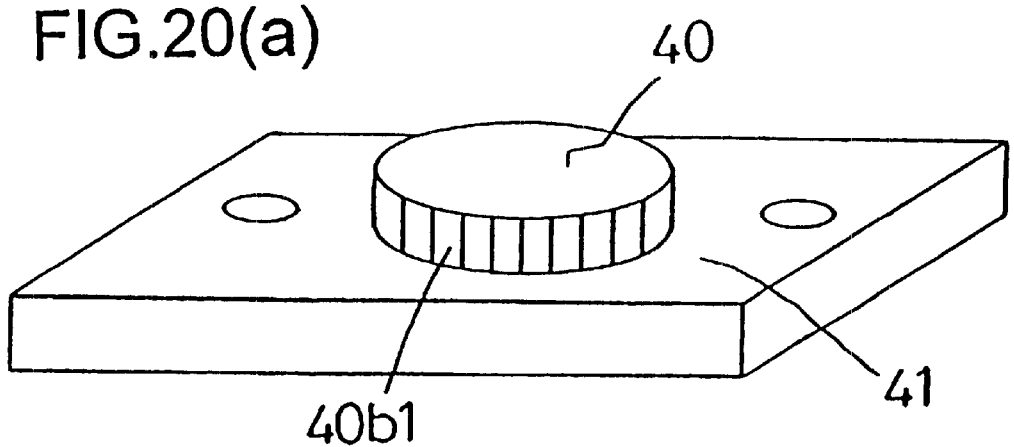
FIG. 20 is views showing a screw unit according to a fifth embodiment; (a) is a perspective view; and (b) is a cross-sectional explanation view.

Next, an embodiment where the present invention is applied to a screw unit will be described as a fifth embodiment. FIG. 20 shows a screw unit according to the fifth embodiment; (a) is a perspective view and (b) is a cross-sectional explanation view.

Referring to FIG. 20, a male screw member 40 is a first member constituted of a male screw portion 40a and a head portion 40b having a knurled portion 40b1 around it. A female screw member 41 is a second member and includes a female screw portion 41a, which is spirally engaged with the male screw portion 40a.

Figure 20B:
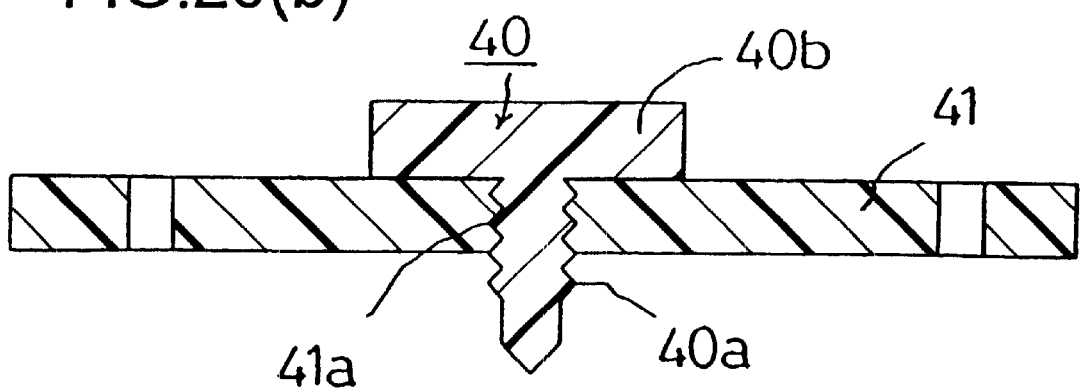

The male screw member 40 and the female screw member 41 are molded from resin materials that are substantially insoluble in one another due to their different melting points, or the like. As a result, two-color molding in an assembled state as shown in FIG. 20(b) can be achieved.

In addition, in this embodiment, the resin materials constituting the male screw member 40 and the female screw member 41 have approximately the same mold shrinkage factors. For example, a combination of polypropylene with nylon or the like is used as the resin materials for the male screw member 40 and the female screw member 41. Due to this, defects after molding, such as galling caused by inconformity of a screw thread, are preventable.

Then, since the both materials are substantially insoluble in one another, they are separated and are capable of being released from the screw fastening as needed. In this embodiment, it is to be noted that the male screw portion 40a can be removed from the female screw member 41 by manually turning the knurled portion 40b1 formed in the male screw portion 40a. It may also be possible to remove the male screw portion by providing a bit hole for a driver on the head portion of the screw, instead of using the knurled portion.

Thus, by carrying out the insert molding or two-color molding with the materials that are substantially insoluble in one another, the male screw member and the female screw member are molded in an already assembled state, thereby decreasing the number of assembly steps.

Figure 21:
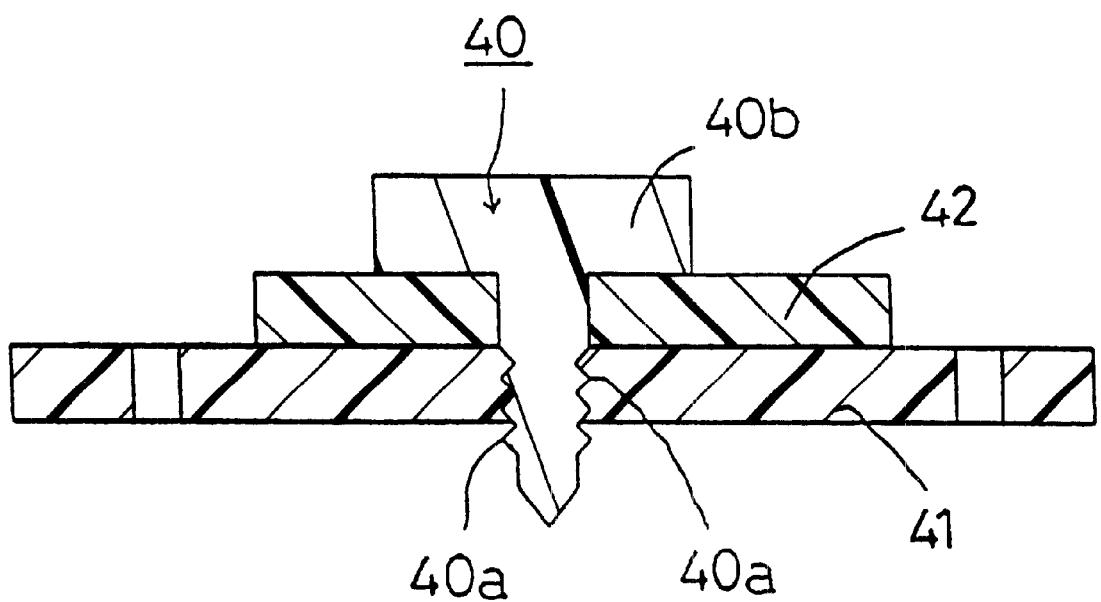
FIG. 21 is a perspective explanation view showing another example of the screw unit.

FIG. 21 is a perspective explanation view showing another example of the screw unit. The screw unit shown in FIG. 21 is a unit molded by three-color molding with the materials insoluble in each other, so that an intermediate member 42 is sandwiched between the male screw portion 40 and the female screw portion 41 shown in FIG. 20.

As a material for constituting the intermediate member 42, a material having a smaller mold shrinkage factor than those of the male screw member 40 and the female screw member 41 is used. Examples of such a material include ABS, PS, polycarbonate, or the like. Due to this, after molding is completed, the intermediate member 42 is fastened by the male screw member 40 and the female screw member 41. Therefore, the mold, with, no assembly unevenness, can be provided for use as it is. Then, the intermediate member 42 can be removed by manually turning the knurled portion 40b1 of the male screw member 40 in the same way as that of the aforementioned embodiment.

Figure 22A:
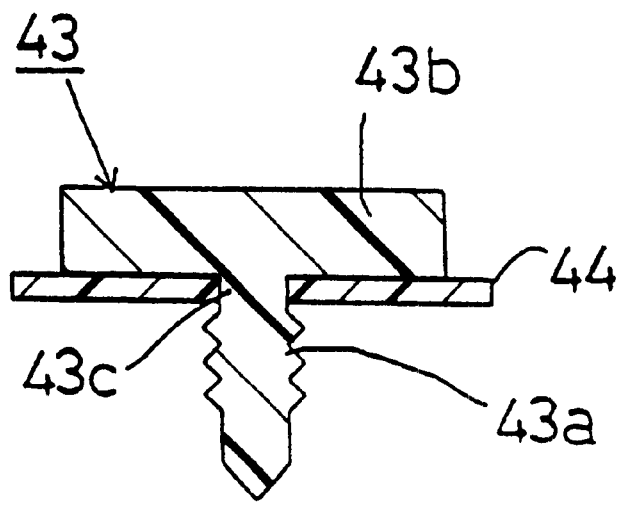
FIG. 22 is views showing yet another example of the screw unit; (a) is a cross-sectional view; and (b) is a perspective explanation view.
Figure 22B:
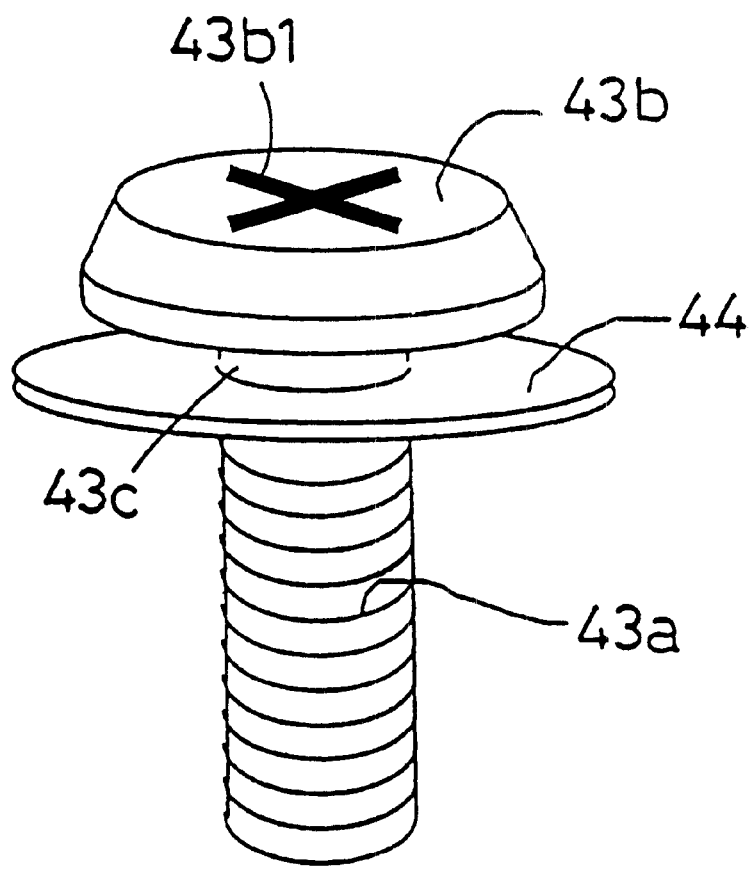

FIG. 22 shows yet another example of the screw unit; (a) is a cross-sectional view and (b) is a perspective explanation view. The screw unit shown in FIG. 22 includes a male screw member 43 as a first member constituted of a male screw portion 43a and a head portion 43b having, around it, a bit hole 43b1 for a driver; and a washer member 44 as a second member, which is fitted in a freely rotatable manner around a straight portion 43c at the root of the screw portion of the male screw member 43, but which is so structured not to be re moved due to the male screw portion 43a of the male screw member 43 serving as a slip stopper.

Then, the male screw member 43 and the washer member 44 can be manufactured by two-color molding with resin materials being substantially insoluble in each other in the same way as the aforementioned screw unit. At this time, the resin materials are selected so that a mold shrinkage factor of the resin material for the male screw member 43 is greater than that for the washer member 44. Due to this, the washer member 43 is freely rotatable with respect to the male screw member 43 without falling off.

It is to be noted that the washer member is not limited to the flat washer, but various types of washers, for example, a spring washer, a washer with dents, or the like are applicable as the washer member.

Sixth Embodiment

Next, an embodiment where the present invention is applied to a slide unit will be described as a sixth embodiment.

Figure 23:
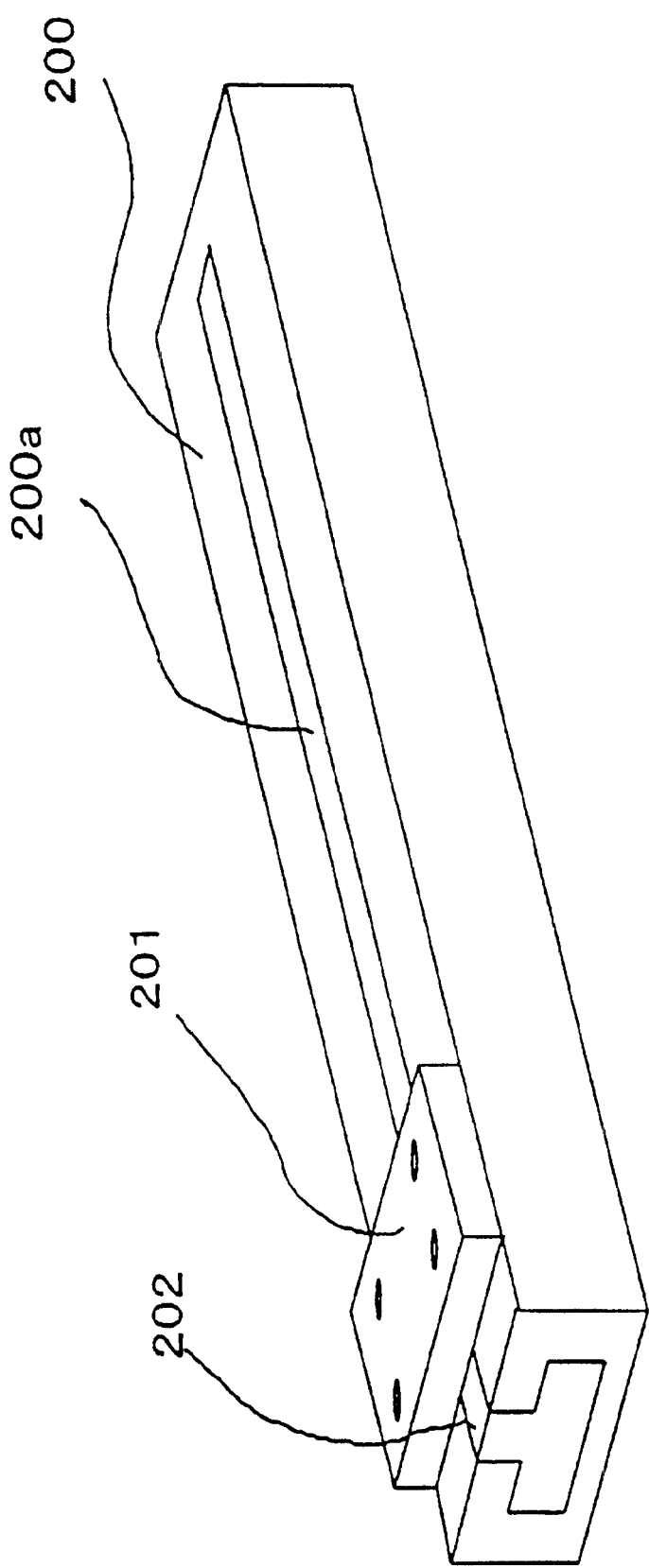
FIG. 23 is a perspective explanation view of a conventional slide unit.

FIG. 23 is a perspective explanation view of a conventional slide unit. Conventionally, as shown in FIG. 23, a rail member 200 having a rail portion 200a and a slide member 201 moving along the rail portion 200a have been independently manufactured as a first member, and further a slip stopping member 202 has been added, with the result that the slide unit has been manufactured by engagingly assembling those three members.

This method, however, requires the step of independently manufacturing these three parts and thereafter engagingly assembling these parts, which has become a factor in increasing cost. In addition, since each part has been independently manufactured, errors in size and shape easily occur. Further, the slip stopping member 202 is required to prevent the sliding member from slipping off from the rail member 200, thereby increasing the number of the parts.

Hence, the present embodiment, solving these problems, is to provide a slide unit, which is easily manufactured without causing the errors in size and shape.

Figure 24:
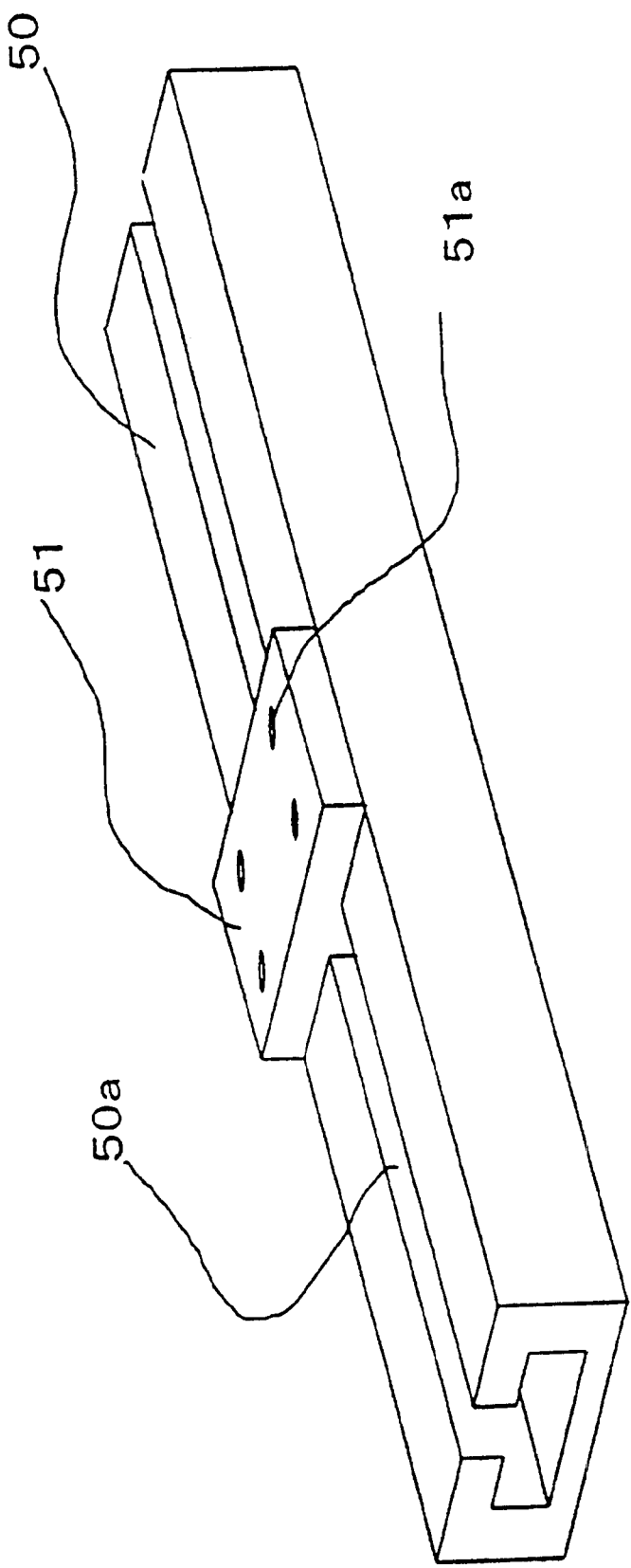
FIG. 24 is a perspective explanation view of a slide unit according to a sixth embodiment.

FIG. 24 is a perspective explanation view of a slide unit according to the sixth embodiment. A rail member 50 as a first member is engaged with a slide member 51 is a second member, which is slidable along the rail member 50. The slide member 51 is guided by a rail portion 50a of the rail member 50.

The slide member 51 is provided with screw holes 51a. With the use of the screw holes 51a, an apparatus (not shown) is to be attached. Thus, the present slide unit is usable as a slide unit mechanism in various kinds of mechanical apparatuses.

It is to be noted that, as materials for the rail member 50 and the slide member 51 constituting the slide unit, materials that are substantially insoluble in each other due to their different melting points or the like are used. Here, it is preferable to use, for example, a polybutylene and polystyrene, or the like as the materials having substantially no compatibility. Then, for example, two-color molding is carried out by injection molding with the use of the resin materials.

The materials are selected so that a mold shrinkage factor of the material for the rail member is greater than that for the slide member, when the injection molding is carried out. Due to this, after molding is completed, there is obtained between the rail member 50 and the slide member 51 a clearance, which can assure the movement of the slide member. With this arrangement, as shown in FIG. 24, manufacturing can be carried out at one time by insert molding or two-color molding so that rail member 50 and the slide member 51 are formed in an assembled state.

It is to be noted that the present embodiment has a structure where the screw holes 51a are provided so as to attach another mechanical apparatus, but when the other apparatus is not required to be attached to the slide member, for example, the slide member is used as a density control knob or the like in an image forming apparatus, the screw holes 51 are not required to be provided.

FIG. 25 is a perspective explanation view showing another example of the slide unit. In the slide unit shown in FIG. 25, the slip stopping portion 50b for preventing the side member 51 of the aforementioned slide unit in FIG. 24 from slipping down is integrally formed with both end portions in a sliding direction of the shown rail member 50. Thus, when sliding to the end portion of the rail portion 50a, the old slide member 51 does not hit the slip stopping portion 50b and then fall off from the rail member 50.

FIG. 25(b) is a bottom plane view of the slide unit shown in FIG. 25(a), and at the bottom surface of the rail member 50, there is an angular hollow portion 50c as an extracting hollow in consideration of injection molding.

Generally, it is difficult for the slide unit having this type of shape to be provided with a slip stopping shape of sufficient strength. This is because the slip stopping structure, if it is formed, becomes a hindrance when the slide member is incorporated, resulting in the slide member not being incorporated or not having sufficient strength. In order to deal with this problem, conventionally, a slip stopping member is added, and the slide member 51 is incorporated into the rail member 50. Thereafter, the slip stopping member is assembled. However, the present embodiment can provide the slide unit with the number of parts and the number of the assembly steps greatly decreased.

FIG. 26 is a perspective explanation view showing yet another example of the slide unit. The slide unit shown in FIG. 26 is constituted of three parts in a rod antenna shape, the three parts including a front end member 52 as a first member, an intermediate member 53 as a second member, and a rear end member 54 as a third member. In addition, this embodiment is provided with slip stopping portions 53a and 54a respectively for the intermediate member 53 and the rear end member 54.

Each of the three members 52, 53, and 54 is retractably movable along its adjacent members. At this time, the materials for the three parts are substantially insoluble in the same manner as those in the aforementioned embodiment, but the same materials may be used for the front end member 52 and the rear end member 54 as long as the intermediate member 53 has substantially no compatibility with the front end member 52 and the rear end member 54 respectively. This means that, when a structure includes three or more members, the members can slidingly move as long as each of the parts has substantially no compatibility only with its adjacent members. In addition, the materials are selected so that mold shrinkage factors of the parts decrease in the order starting from the front end member 53, which has the greatest mold shrinkage factor, to the intermediate member 53 and to the rear end member 54, which has the smallest mold shrinkage factor. Due to this, clearances between the respective adjacent members can be obtained.

With the structure as mentioned above, a slide unit including two or more parts in a retractable rod antenna shape with a slip stopping mechanism can be manufactured. Thus is also usable as a retractable shaft, an antenna by providing its material an electroconductive property, and further a tray having a flat shape.

Figure 27:
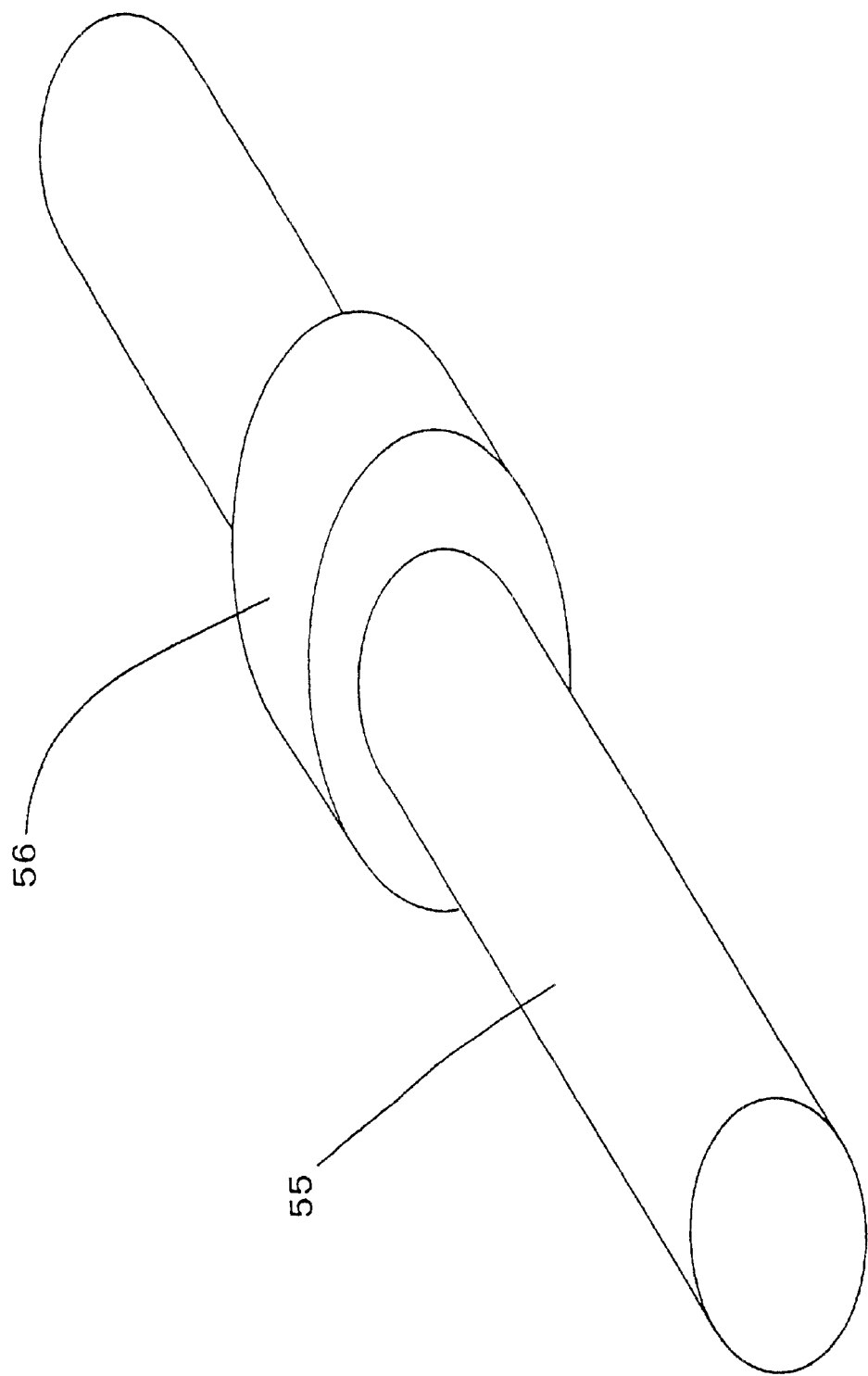
FIG. 27 is a perspective explanation view showing yet another example of the slide unit.

FIG. 27 is a perspective explanation view showing further another example of the slide unit. The slide unit shown in FIG. 27 is constituted of a shaft member 55 and a bearing member 56. In this case, manufacturing is performed by two-color molding where the shaft member 55 is first molded and thereafter the bearing member 56 is molded. When molding is being conducted, the bearing member 56 is molded in a shape following the outside shape of the shaft member 55. Thus, a relation between the size of the outside shape of the shaft member 55 and the size of the hollow of the being member 56 is maintained, thereby securing an appropriate clearance therebetween.

Although the materials for the two members are substantially insoluble in one another in the same manner as in the aforementioned embodiment, only the mold shrinkage factors of the two, materials can control the size of the outside shape of the shaft member and the size of the hollow of the bearing member. That is, the materials are selected so that a mold shrinkage factor of the shaft member 55 is greater than that of the bearing member 56. Thus, a stable slide bearing unit with a controlled clearance between the shaft member and the bearing member controlled can be manufactured. This unit can be used as a carrier unit of a typewriter or the like. It is to be noted that the shaft member 55 has an ecliptic cross-sectional shape, but it may be a square bar shape, and a freely shaped shaft member and a bearing member with a shape following that of the shaft member can be manufactured.

Seventh Embodiment

Next, an embodiment where the present invention is applied to a syringe unit will be described as a seventh embodiment.

Figure 28A:
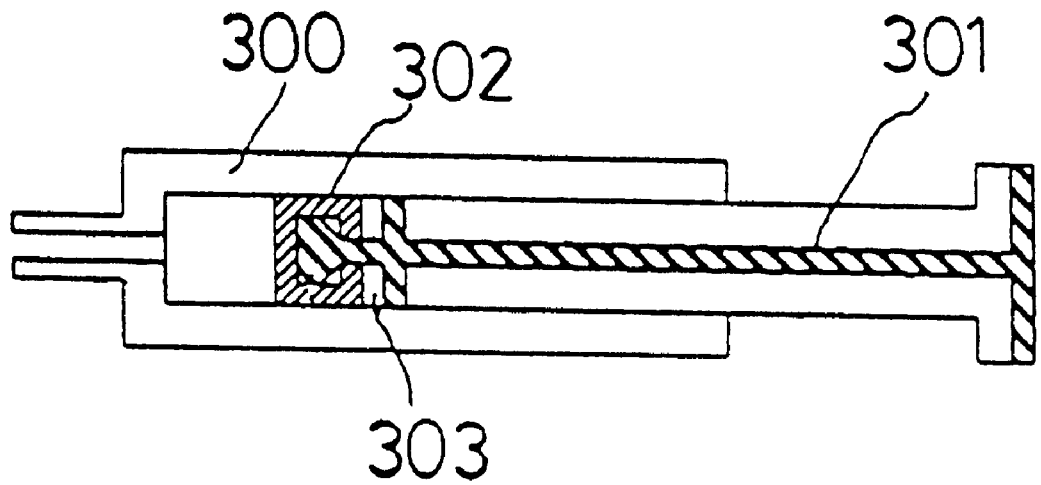
FIG. 28 is a cross-sectional explanation view of a conventional syringe.
Figure 28B:
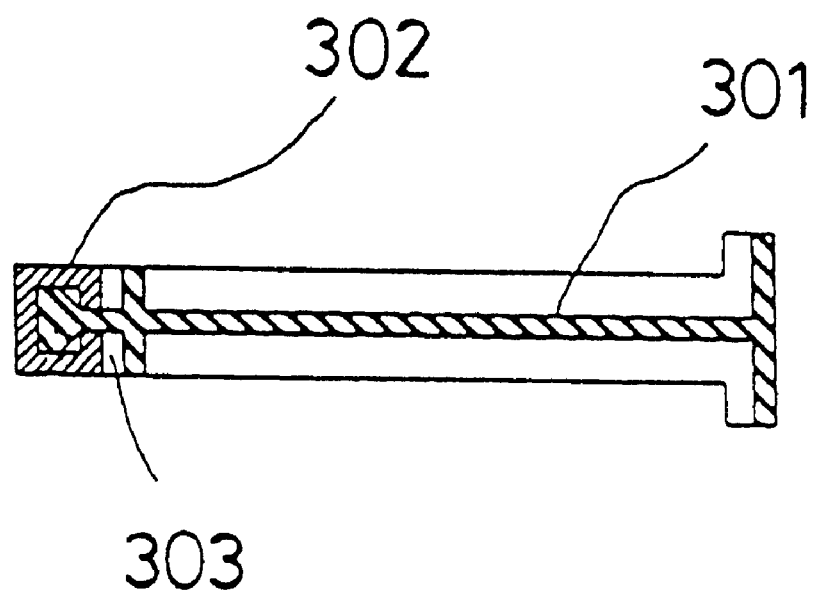

FIG. 28 is a perspective explanation view of a conventional syringe. As shown in FIG. 28(a), the syringe is conventionally constituted of three parts including a cylinder member 300, a piston member 301, and an elastic member 302, where the elastic member 302 is fitted to the piston member 301 beforehand, as shown in FIG. 28(b), and the members thus fitted together are then inserted into the cylinder member 300, thereby manufacturing a finished article.

This method, however, requires assembling three parts into an integral form, thereby increasing not only time but also cost. Furthermore, sanitary management is required until the assembly process is completed. In addition, a clearance is always produced as shown in FIG. 28(b), because the piston member 301 and the elastic member 302 are to be assembled, and this allows chemicals or foreign materials to be mixed easily, and therefore it is unfavorable in terms of management.

Hence, the present embodiment, solving these problems, is to provide a syringe unit that eliminates assembly operations and facilitates clearance management.

Figure 29A:
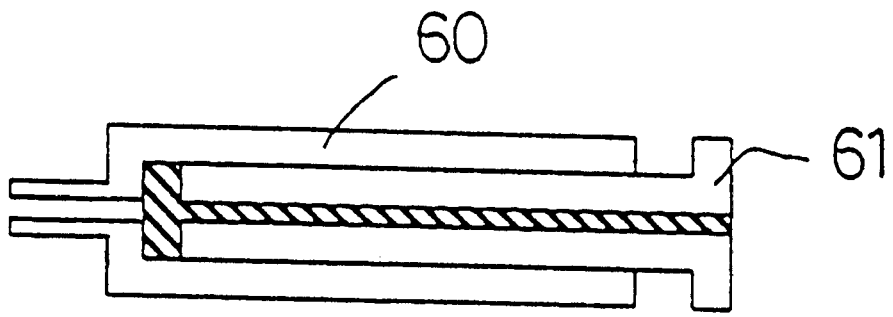
FIG. 29 is a cross-sectional explanation view of a syringe unit according to a seventh embodiment.

FIG. 29 is a cross-sectional explanation view of a syringe unit according to the seventh embodiment, and the syringe unit is constituted of a cylinder member 60 and a piston member 61. The cylinder member 60 and the piston member 61 are molded by insert molding or two-color molding in a state of being incorporated as shown in FIG. 29(a) with the use of a combination of resin materials that are substantially insoluble in one another.

Figure 29B:
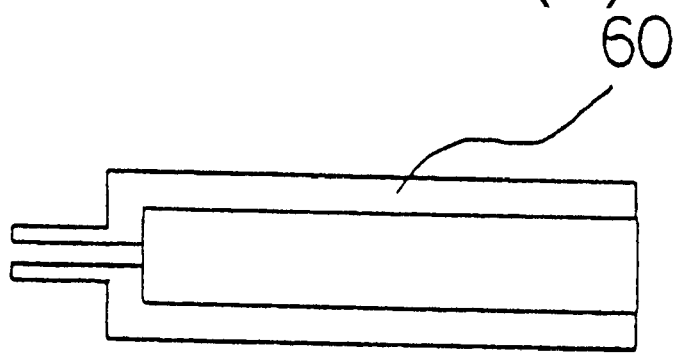
Figure 29C:
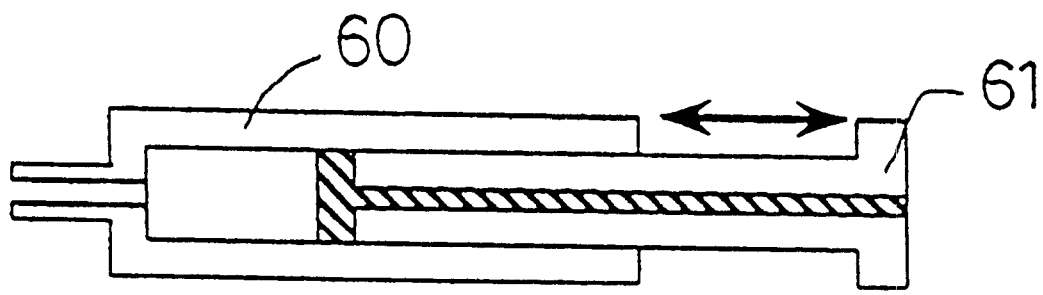

At a first stage of the molding operation, as shown in FIG. 29(b), a transparent resin material is first molded into the cylinder member 60. Next, a resin material having substantially no compatibility with the cylinder member 60 is molded into the piston member 61, thereby manufacturing the syringe unit with the cylinder member 60 and the piston member 61 incorporated as shown in FIG. 29(a).

Here, the material used for molding the piston member 61 is selected so as to have a smaller mold shrinkage factor than that of the cylinder member 60. With this selection, after molding is completed, a moderate binding force is applied to the piston member 61 by means of the cylinder member 60, so sealing property as a pump can be obtained.

In addition, because the materials used for molding the cylinder member 60 and the piston member 61 are substantially insoluble in one another, they are not united. As a result, the piston member 61 can be freely moved in a shaft direction indicated by an arrow shown in FIG. 29(c).

FIG. 30 is a cross-sectional explanation view showing another example of the syringe unit. The syringe unit shown in FIG. 30(a) is a unit that is the same as the syringe unit in FIG. 29, except that an elastic member 62 for a sealing purpose is also provided. Similar to the aforementioned syringe unit, the materials for cylinder member 60 and the piston member 61 are resin materials having substantially no compatibility with one another. The materials for the elastic member 62 and the cylinder member 60 are also in a combination of the resin materials that are substantially insoluble in one another, but the materials for the elastic member 62 and the piston member 61 are soluble in one another. It is to be noted that rubbers, elastic materials such as elastomer or the like, are preferably used as the elastic member 62.

Figure 30A:
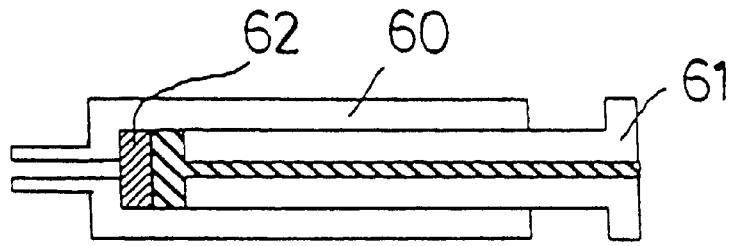
FIG. 30 is a cross-sectional explanation view showing another example of the syringe unit.
Figure 30B:
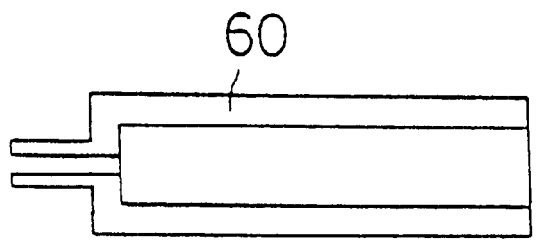
Figure 30C:
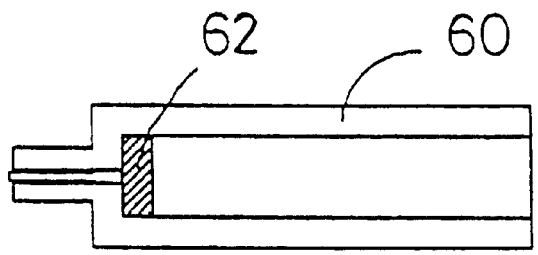
Figure 30D:
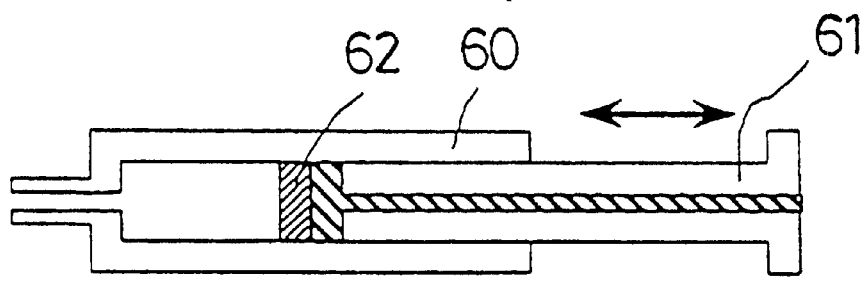

In order to mold this unit, as shown in FIG. 30(b), a transparent resin material is first molded into the cylinder member 60. Next, as shown in FIG. 30(c), a resin material that is substantially insoluble in the cylinder member 60 is molded into the elastic member 62. Finally, a resin material that is soluble in the elastic member 62 is molded into the piston, thereby forming the syringe unit as shown in FIG. 30(d).

Only the elastic member 62 and the piston member 61 are united from the standpoint of the presence or absence of the compatibility with one another. As a result, in the syringe unit after it is completed, the piston member 61, can be freely moved in a shaft direction shown by an arrow in FIG. 30(d). In addition, since the mold shrinkage factor of the material for molding the elastic member 62 is smaller than that for the cylinder member 60, after molding is completed, a moderate binding force is applied to the elastic member 62 by a means of the cylinder member 60, and the elastic member 62 is fitted to the inside surface of the cylinder with a predetermined interference, thereby providing a sealing property as a pump.

FIG. 31 is a cross-sectional view showing yet another example of the syringe unit. In the syringe unit shown in FIG. 31, the elastic member 62 and the piston member 61 of the syringe unit shown in FIG. 30 are now structured with the use of a combination of resin materials that are substantially insoluble in one another.

In this case, where the combination of the resin materials that substantially insoluble in one another is used for the elastic member 62 and the piston member 61, after molding is completed, the elastic member 62 and the piston member 61 are not united. Therefore, when the piston member 61 is moved, the elastic member 62 is detached therefrom. In order to prevent this problem, there may be provided with a slip stopping structure, which can prevent the elastic member 62 from being separated from the piston member 61.

Figure 31A:
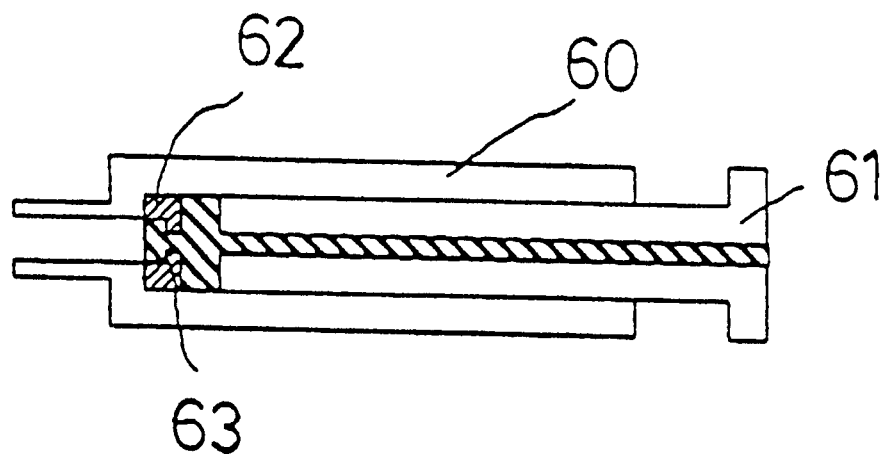
FIG. 31 is a cross-sectional explanation view showing yet another example of the syringe unit.
Figure 31B:
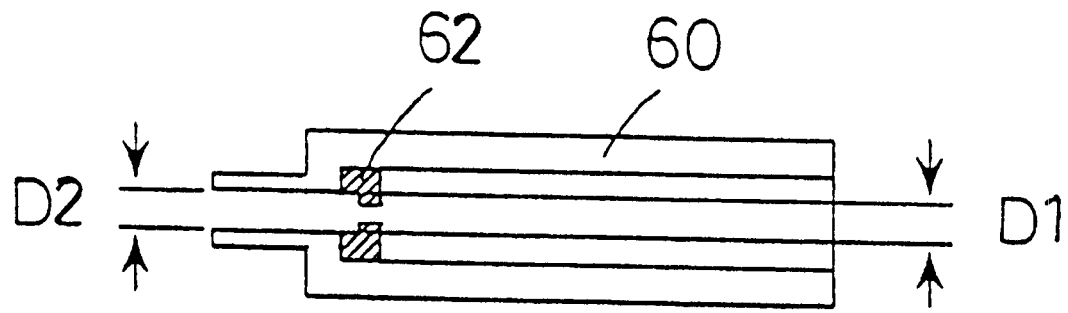

In order to form the structure as shown in FIG. 31(a), an anchor portion 63 is provided to the piston member 61. With this arrangement, the elastic member 62 and the piston are united, so that such a situation, after molding is completed, is preventable because the elastic member 62 is to be detached when the piston member 61 is moved. It is to be rioted that FIG. 31(b) shows a situation in the middle of the molding stage, where the elastic member 62 is molded after the cylinder member 60 has been molded, and at this time, it is required for the convenience of the mold that a diameter D1 of a portion corresponding to the anchor portion 63 be smaller than a diameter D2 of the discharging portion of the cylinder member 60.

By providing the anchor portion 63 as mentioned above, the elastic member 62 and the piston member 61 can be structured with the use of a combination of the resin materials that are substantially insoluble in one another.

In the present invention structured as mentioned above, since there is substantial insolubility between the first member and the second member, each of the plural members, molded by insert molding or two-color molding, is to be separated in an assembled state. This, therefore, eliminates the necessity of assembly steps for the plural parts. In addition, by making a mold shrinkage factor vary between the first resin material and the second resin material, a clearance between the members can be controlled easily and with good accuracy.

Thus, a bearing part, roller part or drive unit, which is constituted of incorporated plural members, can be easily manufactured.

What is claimed is:

1. A resin molded article which is molded, using at least a first resin material, a second resin material and a third resin material having substantially no compatibility with one another, by an insert molding or a three-color molding to be in a state where (i) a roller member; (ii) a shaft member, which axially supports the roller member in a freely rotatable manner; and (iii) an elastic member having a cylindrical shape provided at an outer peripheral surface of the roller member are incorporated, wherein a mold shrinkage factor of the shaft member is greater than that of the roller member so that a clearance is produced between the roller member and the shaft member, wherein a mold shrinkage factor of the elastic member is greater than that of the roller member so that the elastic member is able to tighten the roller member, and wherein the shaft member has a slip stopping portion to regulate movement of the roller member in a shaft direction and the roller member has a plurality of protrusions, which protrude in a direction of a radius of the roller member, to regulate movement of the elastic member in the shaft direction and a rotating direction.

* * * * *

UNITED STATES PATENT AND TRADEMARK OFFICE
CERTIFICATE OF CORRECTION

PATENT NO. : 6,702,469 B1
DATED : March 9, 2004
INVENTOR(S) : Hisashi Taniguchi et al.

It is certified that error appears in the above-identified patent and that said Letters Patent is hereby corrected as shown below:

Title page,
Item [57], ABSTRACT,
Line 1, "The present invention relates to an" should read -- A --; and
Line 2, "molded," should read -- molded --.

Column 7,
Line 16, "spring is" should read -- spring's --;
Line 20, "tog" should read -- tog --; and
Line 27, "fitted" should read -- fitted, --.

Column 9,
Line 6, "an" should be deleted;
Line 7, "the" should read -- the like --; and
Line 46, "that" should be deleted.

Column 12,
Line 33, "with," should read -- with --.

Column 13,
Line 21, "is" (second occurrence) should read -- as --.

Column 14,
Line 64, "two," should read -- two --.

Signed and Sealed this

Twenty-seventh Day of July, 2004

JON W. DUDAS
*Acting Director of the United States Patent and Trademark Office*